United States Patent
Won et al.

(10) Patent No.: US 10,621,300 B2
(45) Date of Patent: Apr. 14, 2020

(54) COMPUTING SYSTEM FOR PERFORMING COLORLESS ROUTING FOR QUADRUPLE PATTERNING LITHOGRAPHY

(71) Applicant: SAMSUNG ELECTRONICS CO., LTD., Suwon-si, Gyeonggi-Do (KR)

(72) Inventors: Hyo-Sig Won, Suwon-si (KR); Myung-Soo Jang, Seoul (KR); Hyoun-Soo Park, Seoul (KR); Da-Yeon Cho, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 220 days.

(21) Appl. No.: 15/792,902

(22) Filed: Oct. 25, 2017

(65) Prior Publication Data
US 2018/0173837 A1 Jun. 21, 2018

(30) Foreign Application Priority Data
Dec. 16, 2016 (KR) .................. 10-2016-0172892

(51) Int. Cl.
*G06F 17/50* (2006.01)
*G03F 1/70* (2012.01)
(Continued)

(52) U.S. Cl.
CPC .......... *G06F 17/5081* (2013.01); *G03F 1/68* (2013.01); *G03F 1/70* (2013.01); *G03F 1/76* (2013.01);
(Continued)

(58) Field of Classification Search
CPC .......... G06F 17/5081; G06F 17/5072; G06F 17/5077; G06F 2217/12; H01L 21/31144;
(Continued)

(56) References Cited

U.S. PATENT DOCUMENTS 8,418,111 B2 * 4/2013 Chen .................. G06F 17/5077
716/119
8,448,100 B1 * 5/2013 Lin .......................... G03F 1/70
716/50

(Continued)

OTHER PUBLICATIONS

Qiang Ma, et al., "Triple Patterning Aware Routing and Its Comparison with Double Patterning Aware Routing in 14nm Technology", DAC2012, Jun. 3-7, 2012, pp. 591-596.
(Continued)

*Primary Examiner* — Naum Levin
(74) *Attorney, Agent, or Firm* — F. Chau & Associates, LLC

(57) ABSTRACT

A computer-implemented method includes placing standard cells based on design data defining an integrated circuit. A layout of the integrated circuit is generated by performing colorless routing. First, second, third and fourth patterns included in a quadruple patterning lithography (QPL) layer are arranged, based on space constraints, on the placed standard cells. The generated layout is stored to a computer-readable storage medium. The space constraints define minimum spaces between the first, second, third and fourth patterns. The method includes assigning first, second, third and fourth colors to the first, second, third and fourth patterns, respectively. Masks are generated based on the layout. A semiconductor device is manufactured by using the generated masks. A space between two patterns of the first, second, third and fourth patterns smaller than a corresponding space constraint of the space constraints indicates a color violation.

20 Claims, 22 Drawing Sheets

(51) Int. Cl.
  *G03F 7/20* (2006.01)
  *G03F 1/76* (2012.01)
  *H01L 21/311* (2006.01)
  *G03F 1/68* (2012.01)

(52) U.S. Cl.
  CPC ...... *G03F 7/70283* (2013.01); *G03F 7/70466* (2013.01); *G06F 17/5072* (2013.01); *G06F 17/5077* (2013.01); *H01L 21/31144* (2013.01); *G06F 2217/12* (2013.01)

(58) Field of Classification Search
  CPC ..... G03F 1/76; G03F 1/68; G03F 1/70; G03F 7/70466; G03F 7/70283
  See application file for complete search history.

(56) References Cited

U.S. PATENT DOCUMENTS

| | | | |
|---|---|---|---|
| 8,484,607 B1 | 7/2013 | Tang et al. | |
| 8,677,291 B1 | 3/2014 | Yuan et al. | |
| 8,694,945 B2* | 4/2014 | Wang | H01L 23/5286 257/786 |
| 8,707,230 B1* | 4/2014 | Hu | G06F 17/5036 716/110 |
| 8,954,913 B1* | 2/2015 | Yuan | G06F 17/5068 716/126 |
| 9,029,230 B2 | 5/2015 | Xiao et al. | |
| 9,141,752 B2 | 9/2015 | Lin et al. | |
| 9,158,885 B1 | 10/2015 | Gray et al. | |
| 9,183,341 B2 | 11/2015 | Chen et al. | |
| 9,330,221 B2* | 5/2016 | Yuan | G06F 17/5077 |
| 9,335,624 B2* | 5/2016 | Lee | G03F 1/00 |
| 9,436,792 B2* | 9/2016 | Baek | G06F 17/5081 |
| 9,465,907 B2* | 10/2016 | Hassan | G06F 17/5068 |
| 9,934,347 B2* | 4/2018 | Seo | G06F 17/5072 |
| 9,971,863 B2* | 5/2018 | Hsu | G06F 17/5081 |
| 10,216,883 B2* | 2/2019 | Kim | G03F 7/70425 |
| 10,223,496 B2* | 3/2019 | Lvov | G06T 11/001 |
| 2012/0168841 A1 | 7/2012 | Chen et al. | |
| 2013/0061185 A1 | 3/2013 | Abou Ghaida et al. | |
| 2014/0237435 A1 | 8/2014 | Chen et al. | |
| 2015/0046887 A1 | 2/2015 | Sun et al. | |
| 2015/0121317 A1* | 4/2015 | Lee | G03F 1/00 716/52 |
| 2015/0243600 A1 | 8/2015 | Xiao et al. | |
| 2015/0302129 A1 | 10/2015 | Chen et al. | |
| 2015/0339428 A1* | 11/2015 | Yuan | G06F 17/5077 716/52 |
| 2016/0099217 A1 | 4/2016 | Peng | |
| 2017/0147740 A1* | 5/2017 | Chang | G06F 17/5081 |
| 2018/0068046 A1* | 3/2018 | Lin | G03F 7/0035 |
| 2018/0096092 A1* | 4/2018 | Kim | G06F 17/5077 |
| 2018/0173835 A1* | 6/2018 | Do | G06F 17/5072 |
| 2018/0173838 A1* | 6/2018 | Won | G03F 7/70433 |

OTHER PUBLICATIONS

Zhiqing Liu, et al., "An Effective Triple Patterning Aware Grid-based Detailed Routing Approach", 2015 Design, Automation & Test in Europe Conference & Exhibition, pp, 1641-1646.

Po-Ya Hsu, et al., "Non-stitch Triple Patterning-Aware Routing Based on Conflict Graph Pre-coloring", 2015 IEEE, pp. 390-395.

* cited by examiner

| | DEFINITION |
|---|---|
| DS1 | diff. color space of S2S & C2C |
| DS2 | diff. color space of T2T |
| DS3 | diff. color space of T2S |
| MW | metal min. width |

| | DEFINITION |
|---|---|
| SS1 | same color space of S2S & C2C |
| SS2 | same color space of T2T |
| SS3 | same color space of T2S |
| MW | metal min. width |

COMPUTING SYSTEM FOR PERFORMING COLORLESS ROUTING FOR QUADRUPLE PATTERNING LITHOGRAPHY

CROSS-REFERENCE TO RELATED APPLICATION

This application claims priority under 35 U.S.C. § 119 to Korean Patent Application No. 10-2016-0172892, filed on Dec. 16, 2016, in the Korean Intellectual Property Office, the disclosure of which is incorporated by reference herein in its entirety.

TECHNICAL FIELD

Exemplary embodiments of the present inventive concept relate to an integrated circuit for quadruple patterning lithography (QPL), and more particularly to a computing system and a computer-implemented method for designing the integrated circuit.

DISCUSSION OF RELATED ART

With developments in semiconductor process technologies, design rules of an integrated circuit have become more complicated. For example, a size of gaps between adjacent patterns may be reduced. In consideration of a patterning resolution, a plurality of patterns included in a layer may be formed by using a plurality of masks rather than a single mask. A patterning technology using a plurality of masks may be referred to as a multi-patterning technology. For example, a patterning technology using four masks may be referred to as quadruple patterning lithography (QPL). As an exemplary QPL process, color decomposition in which colors are assigned to a plurality of patterns may be performed.

SUMMARY

According to an exemplary embodiment of the present inventive concept, a computer-implemented method includes placing standard cells based on design data defining an integrated circuit. A layout of the integrated circuit is generated by performing colorless routing. First, second, third and fourth patterns included in a quadruple patterning lithography (QPL) layer are arranged, based on space constraints, on the placed standard cells. The generated layout is stored to a computer-readable storage medium. The space constraints define minimum spaces between the first, second, third and fourth patterns. The method includes assigning first, second, third and fourth colors to the first, second, third, and fourth patterns, respectively. The method includes generating masks based on the layout, and manufacturing a semiconductor device by using the generated masks. A space between two patterns of the first, second, third and fourth patterns smaller than a corresponding space constraint of the space constraints indicates a color violation.

According to an exemplary embodiment of the present inventive concept, a computing system includes a memory configured to store procedures for designing an integrated circuit. A processor is configured to access the memory and to execute the procedures for designing the integrated circuit. The procedures for designing the integrated circuit include a placer configured to place standard cells based on design data defining the integrated circuit. The procedures include a router configured to perform colorless routing. The routing arranges first, second, third and fourth patterns included in a quadruple patterning lithography (QPL) layer, based on space constraints, on the placed standard cells. The space constraints define minimum spaces between the first, second, third and fourth patterns so that a color violation does not occur between the first, second, third and fourth patterns.

According to an exemplary embodiment of the present inventive concept, a method of manufacturing a semiconductor device, the method being performed at least partially by a processor, includes placing standard cells based on design data defining an integrated circuit. A layout of the integrated circuit is generated by performing colorless routing. First, second, third and fourth patterns included in a quadruple patterning lithography (QPL) layer are arranged, based on space constraints, on the placed standard cells. The semiconductor device is manufactured according to the layout by using quadruple patterning lithography. The space constraints define minimum spaces between the first, second, third and fourth patterns so that a color violation does not occur between the first, second, third and fourth patterns.

According to an exemplary embodiment of the present inventive concept, an integrated circuit includes a layer including first, second, third and fourth patterns to which first, second, third and fourth colors are respectively assigned. The first and second patterns extend in a first direction and are adjacent to each other in a second direction perpendicular to the first direction. A side-to-side space between the first and second patterns and a corner-to-corner space between at least two of the first, second, third and fourth patterns meet or exceed minimum space constraints including a minimum side-to-side space between patterns to which different colors are assigned.

According to an exemplary embodiment of the present inventive concept, a semiconductor device includes a substrate, and a layer including a plurality of patterns formed on the substrate using first, second, third, and fourth masks. The plurality of patterns include a first pattern formed using the first mask to extend in a first direction, and a second pattern formed using the second mask to extend in the first direction and to be adjacent to the first pattern in a second direction perpendicular to the first direction. A side-to-side space between the first and second patterns and a corner-to-corner space between at least two of the plurality of patterns meet or exceed minimum space constraints including a minimum side-to-side space between patterns to which different colors are assigned.

According to an exemplary embodiment of the present inventive concept, a computer-readable storage medium has stored thereon a computer program for executing a method. The method includes placing standard cells based on design data defining an integrated circuit. A layout of the integrated circuit is generated by performing colorless routing. First, second, third and fourth patterns included in a quadruple patterning lithography (QPL) layer are arranged, based on space constraints, on the placed standard cells. The generated layout is stored to a computer-readable storage medium. The space constraints define minimum spaces between the first, second, third and fourth patterns so that a color violation does not occur between the first, second, third and fourth patterns.

BRIEF DESCRIPTION OF THE DRAWINGS

The above and other features of the inventive concept will become more apparent by describing in detail exemplary embodiments thereof, with reference to the accompanying drawing, in which.

DETAILED DESCRIPTION OF THE EMBODIMENTS

Exemplary embodiments of the present inventive concept will be described in more detail below with reference to the accompanying drawings.

Figure 1:
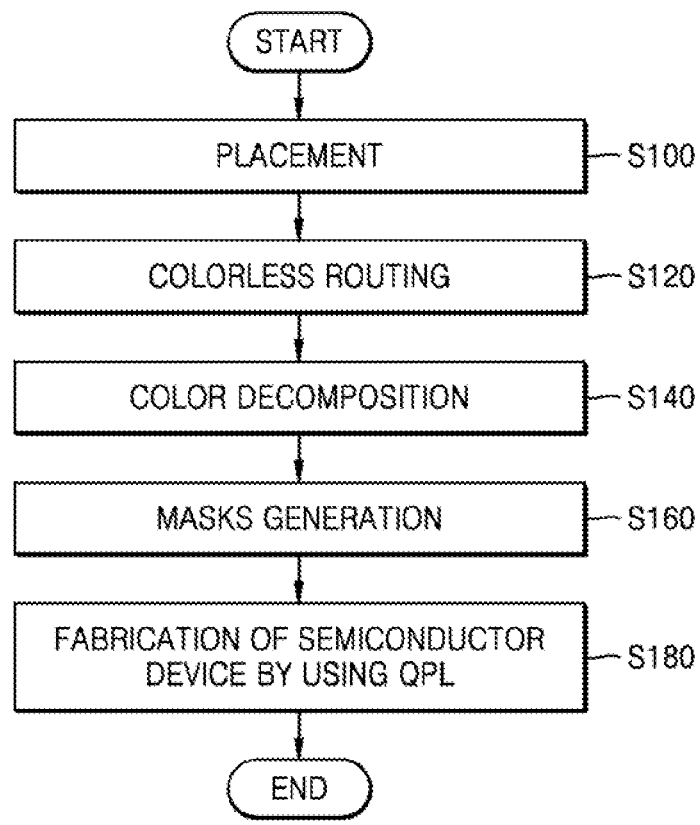
FIG. 1 is a flowchart of a method of manufacturing a semiconductor device according to an exemplary embodiment of the present inventive concept.

FIG. 1 is a flowchart of a method of manufacturing a semiconductor device according to an exemplary embodiment of the present inventive concept. FIGS. 2A, 2B, 2C and 2D are views for describing quadruple patterning lithography (QPL) according to an exemplary embodiment of the present inventive concept. For example, FIGS. 2A through 2D may correspond to results of operations S120, S140, S160, and S180 of FIG. 1, respectively. A method of manufacturing a semiconductor device 100b by using QPL according to an exemplary embodiment of the present inventive concept will be described in more detail below with reference to FIGS. 1 and 2A through 2D. The method may include placement (operation S100), colorless routing (operation S120), color decomposition (operation S140), mask generation (operation S160) and fabrication of a semiconductor device using QPL (operation S180).

In operation S100, standard cells may be placed according to design data that defines an integrated circuit (referred to herein as "design data"). Each of the standard cells may include active regions and gate lines, and may further include contacts and vias on the active regions and the gate lines (see, e.g., standard cells SC described in more detail below with reference to FIG. 15). Each standard cell may further include a first wiring layer including metal patterns on the vias.

In operation S120, a layout 100 of the integrated circuit may be generated by performing colorless routing with respect to the placed standard cells. The colorless routing may refer to an operation of generating a layout without performing color decomposition during a routing operation. According to an exemplary embodiment of the present inventive concept, a QPL layer including a first pattern 101, a second pattern 102, a third pattern 103 and a fourth pattern 104 may be arranged on the placed standard cells, according to space constraints. The space constraints may define minimum spaces between the first through fourth patterns 101 through 104 such that a color violation does not occur between the first through fourth patterns 101 through 104. According to an exemplary embodiment of the present inventive concept, the QPL layer may be a second wiring layer arranged on the first wiring layer. According to an exemplary embodiment of the present inventive concept, a technology file may be adjusted to include the space constraints in the technology file, so that colorless routing may be performed by using a general placement & routing (P&R) tool.

Figure 2A:
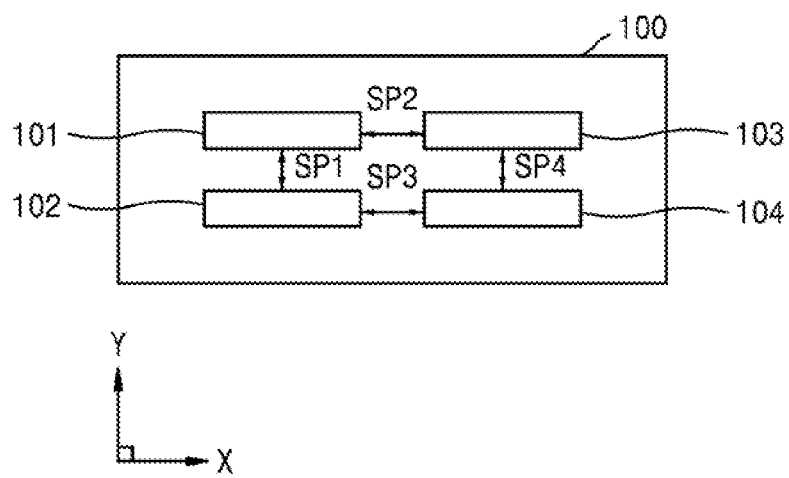
FIGS. 2A, 2B, 2C and 2D are views for describing quadruple patterning lithography (QPL) according to an exemplary embodiment of the present inventive concept.
Figure 2B:
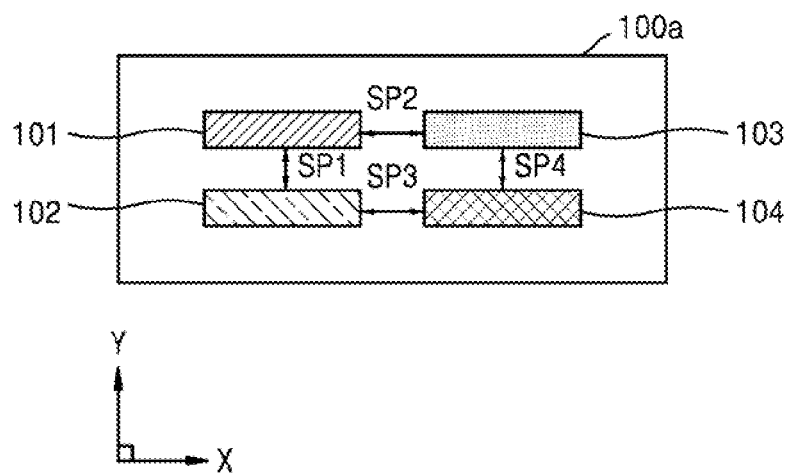

Referring to FIG. 2A, the first through fourth patterns 101 through 104 may extend in a first direction (for example, a direction X). According to an exemplary embodiment of the present inventive concept, the first through fourth patterns 101 through 104 may be arranged such that a first space SP1 between the first and second patterns 101 and 102, a second space SP2 between the first and third patterns 101 and 103, a third space SP3 between the second and fourth patterns 102 and 104, and a fourth space SP4 between the third and fourth patterns 103 and 104 satisfy the space constraints in the technology file. For example, the first and fourth spaces SP1 and SP4 may have substantially a same size as each other and may extend along a same direction (for example, a Y direction), and the second and third spaces SP2 and SP3 may have substantially a same size as each other and may extend along a same direction (for example, the X direction). However, exemplary embodiments of the present inventive concept are not limited thereto.

In operation S140, color decomposition that assigns first through fourth colors to the first through fourth patterns 101 through 104 included in the QPL layer may be performed, based on the generated layout. In a layout 100a described with reference to FIG. 2B, the first through fourth colors may be assigned to the first through fourth patterns 101 through 104, respectively. As an example, the color decomposition may be performed during a data preparation operation. As another example, the color decomposition may be performed during a design rule check operation.

"Routing" is an operation of arranging wiring layers and vias used to connect the placed standard cells, according to design rules with respect to the integrated circuit. Each of the wiring layers may include a plurality of patterns, and the patterns formed in the wiring layers of different levels may be electrically connected to one another through a via including a conductive material. The wiring layer may include a conductive material, such as a metal, and thus, may be referred to as a metal layer. However, exemplary embodiments of the present inventive concept are not limited thereto. As an example, when the routing and the color decomposition are performed together by using a color-aware routing algorithm, complexity of the algorithm may be relatively high.

According to an exemplary embodiment of the present inventive concept, colorless routing that constrains minimum spaces between the first through fourth patterns 101 through 104 of the QPL layer may be performed, without considering the first through fourth colors according to the QPL layer during the routing operation. Thus, the complexity of the routing algorithm may be decreased. Also, according to an exemplary embodiment of the present inventive concept, since the first through fourth patterns 101 through 104 of the QPL layer are arranged to satisfy the space constraints such that a color violation does not occur, the possibility of the occurrence of the color violation may be greatly reduced in a color violation check operation performed after the colorless routing operation.

Figure 2C:
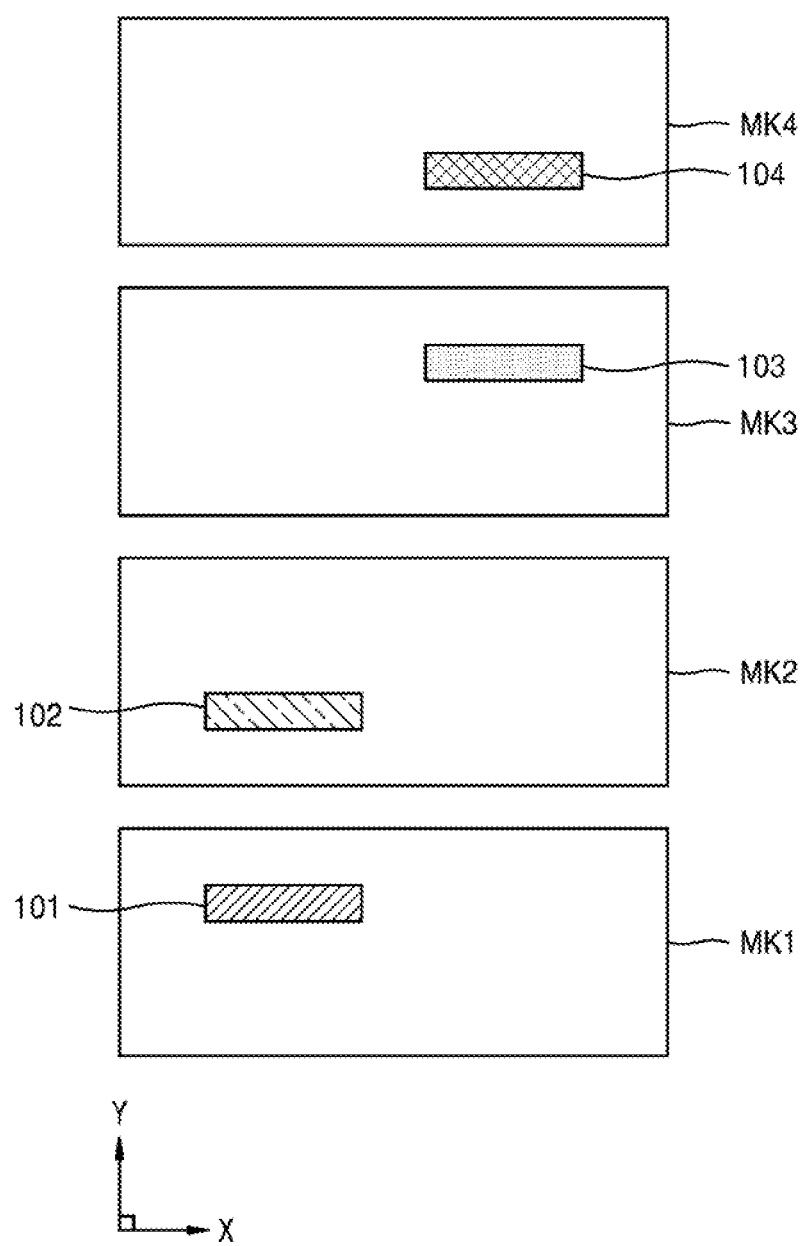
Figure 2D:
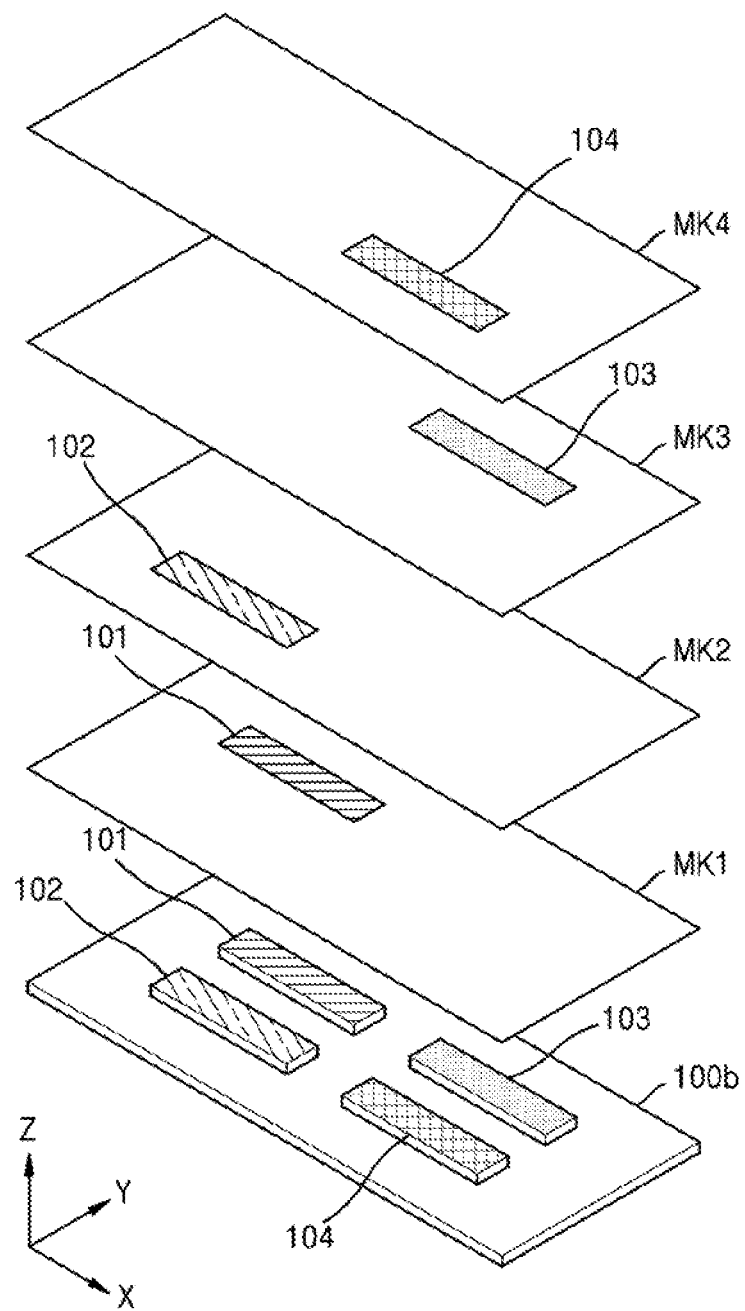

In operation S160, based on a layout on which the color composition is completed, first through fourth masks MK1 through MK4 may be generated. Referring to FIG. 2C, the first mask MK1 may include the first pattern 101 to which the first color is assigned, the second mask MK2 may include the second pattern 102 to which the second color is assigned, the third mask MK3 may include the third pattern 103 to which the third color is assigned, and the fourth mask may include the fourth pattern 104 to which the fourth color is assigned.

In operation S180, a semiconductor device 100b in which the integrated circuit is implemented may be manufactured by using the generated first through fourth masks MK1 through MK4. For example, the semiconductor device 100b in which the integrated circuit is implemented may be formed by performing various semiconductor processes on a semiconductor substrate such as a wafer by using the first through fourth masks MK1 through MK4. For example, the process using the masks may be a lithography process forming a pattern, Thus, a desired pattern may be formed on the semiconductor substrate or a material layer. The semiconductor processes may include a deposition process, an etching process, an ion process, and/or a cleansing process. The semiconductor processes may include a packaging process that mounts a semiconductor device on a printed circuit board (PCB) and seals the semiconductor device with a sealing member, and may include a test process that performs a test on the semiconductor device or the package.

Figure 3:
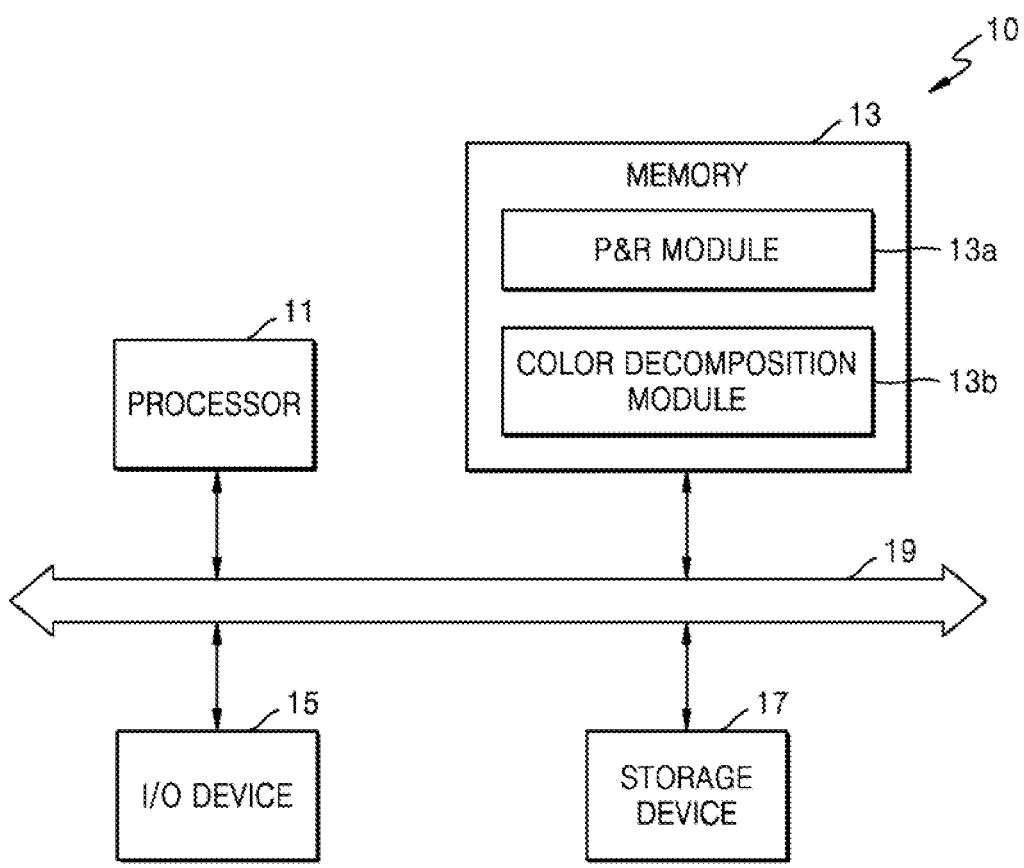
FIG. 3 is a block diagram of a computing system for designing an integrated circuit, according to an exemplary embodiment of the present inventive concept.

FIG. 3 is a block diagram of a computing system for designing an integrated circuit, according to an exemplary embodiment of the present inventive concept.

Referring to FIG. 3, a computing system 10 for designing an integrated circuit (referred to herein as an "integrated circuit design system") may include a processor 11, a memory 13, an input/output (I/O) device 15, a storage device 17, and a bus 19. For example, the integrated circuit design system 10 may perform operations S100, S120, and S140 described in more detail above. According to an exemplary embodiment of the present inventive concept, the integrated circuit design system 10 may be implemented as an integrated device, and thus, may also be referred to as an integrated circuit design device. The integrated circuit design system 10 may be provided as a stand-alone device for designing the integrated circuit of a semiconductor device; however, exemplary embodiments of the present inventive concept are not limited thereto. As an example, the integrated circuit design system 10 may be a computer for driving various simulation took or design tools.

The processor 11 may be configured to execute instructions for performing at least one of various operations for designing the integrated circuit. The processor 11 may communicate, via the bus 19, with the memory 13, the input/output device 15, and the storage device 17. To execute an operation of designing the integrated circuit, the processor 11 may drive a P&R module 13a loaded to the memory 13, and to execute a color decomposition operation with respect to patterns included in a QPL layer, the processor 11 may drive a color decomposition module 13b loaded to the memory 13.

The memory 13 may store programs including instructions for performing placement and routing operations for designing the integrated circuit, and for performing the color decomposition operation. According to an exemplary embodiment of the present inventive concept, the memory 13 may store the P&R module 13a and the color decomposition module 13b, and the P&R module 13a and the color decomposition module 13b may be loaded to the memory 13 from the storage device 17. The P&R module 13a may be, for example, a program including instructions for performing the placement operation according to operation S100 described in more detail above and for performing the colorless routing operation according to operation S120 described in more detail above. The color decomposition module 13b may be, for example, a program including instructions for performing the color decomposition operation according to operation S140 described in more detail above. However, exemplary embodiments of the present inventive concept are not limited thereto, and the memory 13 may further store various modules, such as a timing analysis module, and/or a simulation module. The memory 13 may be a volatile memory, such as static random-access memory (SRAM) or dynamic random-access memory (DRAM), or a nonvolatile memory, such as phase-change random-access memory (PRAM), magnetic random-access memory (MRAM), resistive random-access memory (ReRAM), ferroelectric random-access memory (FRAM), or a flash memory.

The input/output device 15 may control a user input or an output with respect to user interface devices. For example, the input/output device 15 may include an input device, such as a keyboard, a mouse, or a touchpad, and may receive integrated circuit design data. For example, the input/output device 15 may include an output device, such as a display, or a speaker, and may display a placement result, a routing result, or a color decomposition result. The storage device 17 may store various data related to the P&R module 13a and the color decomposition module 13b. The storage device 17 may include a memory card (MMC, eMMC, SD, MicroSD, etc.), a solid state drive (SSD), or a hard disk drive (HDD).

Figure 4:
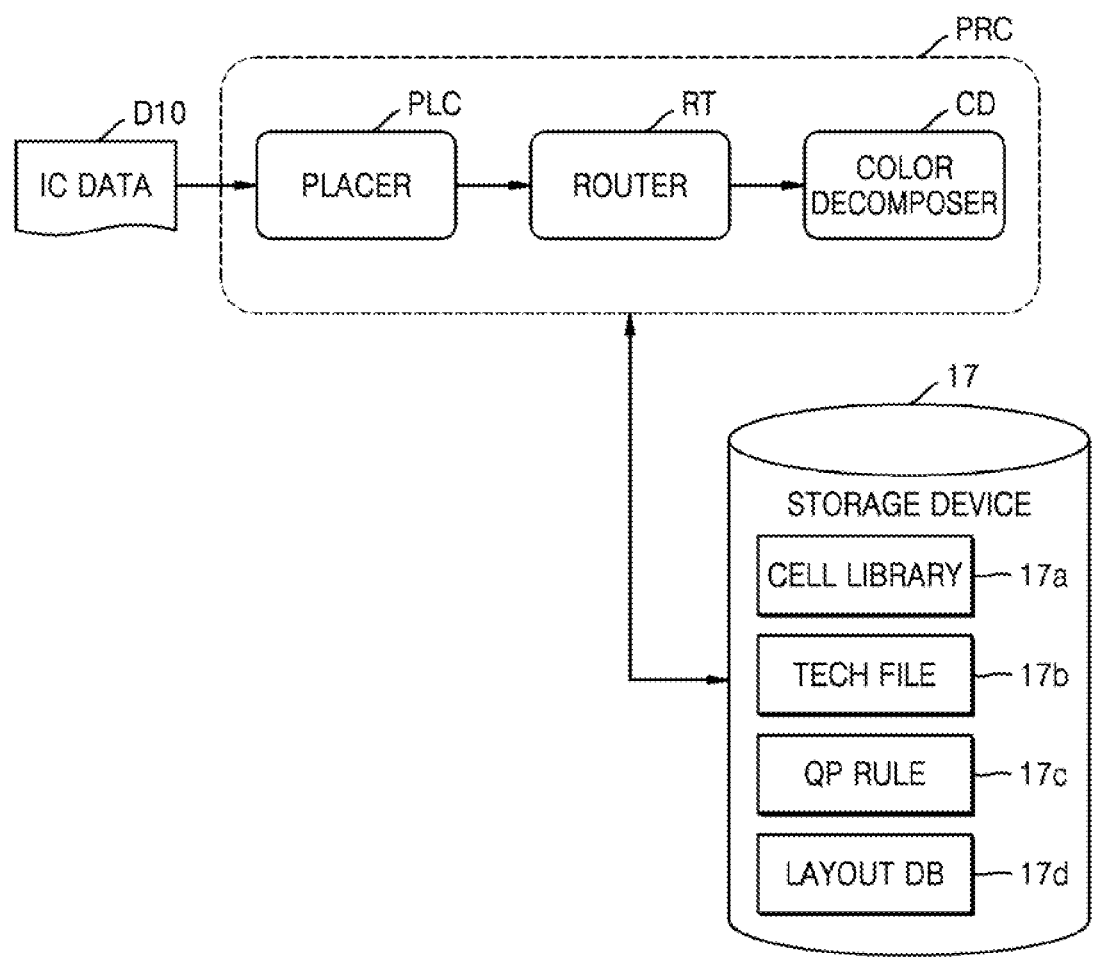
FIG. 4 illustrates an example of a program stored in a memory of FIG. 3.

FIG. 4 illustrates an example of a program stored in a memory of FIG. 3.

Referring to FIG. 4, the program stored in the memory 13 may include a plurality of procedures PRC. The procedures PRC may refer to a series of instructions for performing specific tasks. The procedures PRC may also be referred to as a function, a routine, a subroutine, or a subprogram. According to an exemplary embodiment of the present inventive concept, the procedures PRC may include a placer PLC, a router RT, and a color decomposer CD. The processor 11 described with reference to FIG. 3 may perform an operation by executing one or more of the procedures PRC (e.g., PLC, RT, or CD). Thus, the processor 11 may also be referred to as the placer PLC, the router RT, or the color decomposer CD performing the operation.

The storage device 17 may store a cell library 17a, a technology file 17b, a quadruple patterning (QP) rule 17c, and a layout database (DB) 17d. The cell library 17a may store information with respect to a standard cell that is used to generate a layout of an integrated circuit, and may be referred to as a standard cell library. The QP rule 17c may store a patterning rule with respect to a QPL layer. The layout DB 17d may store information with respect to a layout generated in the procedures PRC, for example, physical information about the layout.

The technology file 17b may store rules and definitions that are used in a process of manufacturing the integrated circuit. For example, the technology file 17b may store a layer definition, a device definition, and/or design rules. According to an exemplary embodiment of the present inventive concept, the technology file 17b may include space constraints with respect to patterns of a QPL layer. The space constraints included in the technology file 17b will be described in more detail below with reference to FIGS. 7A, 7B, 7C, 7D, 7E, 8A, 8B, 8C, 8D, 8E, 10, and 12.

The placer PLC may place standard cells based on integrated circuit (IC) design data D10. For example, the placer PLC may perform the placement operation by accessing the cell library 17a. The router RT may perform colorless routing on the standard cells placed by the placer PLC and may generate a layout. For example, the router RT may perform the colorless routing based on the space constraints included in the technology file 17b. The color decomposer CD may assign first through fourth colors respectively corresponding to first through fourth masks, to patterns included in the QPL layer, based on the generated layout. For example, the color decomposer CD may perform the color decomposition based on the QP rule 17c.

Figure 5:
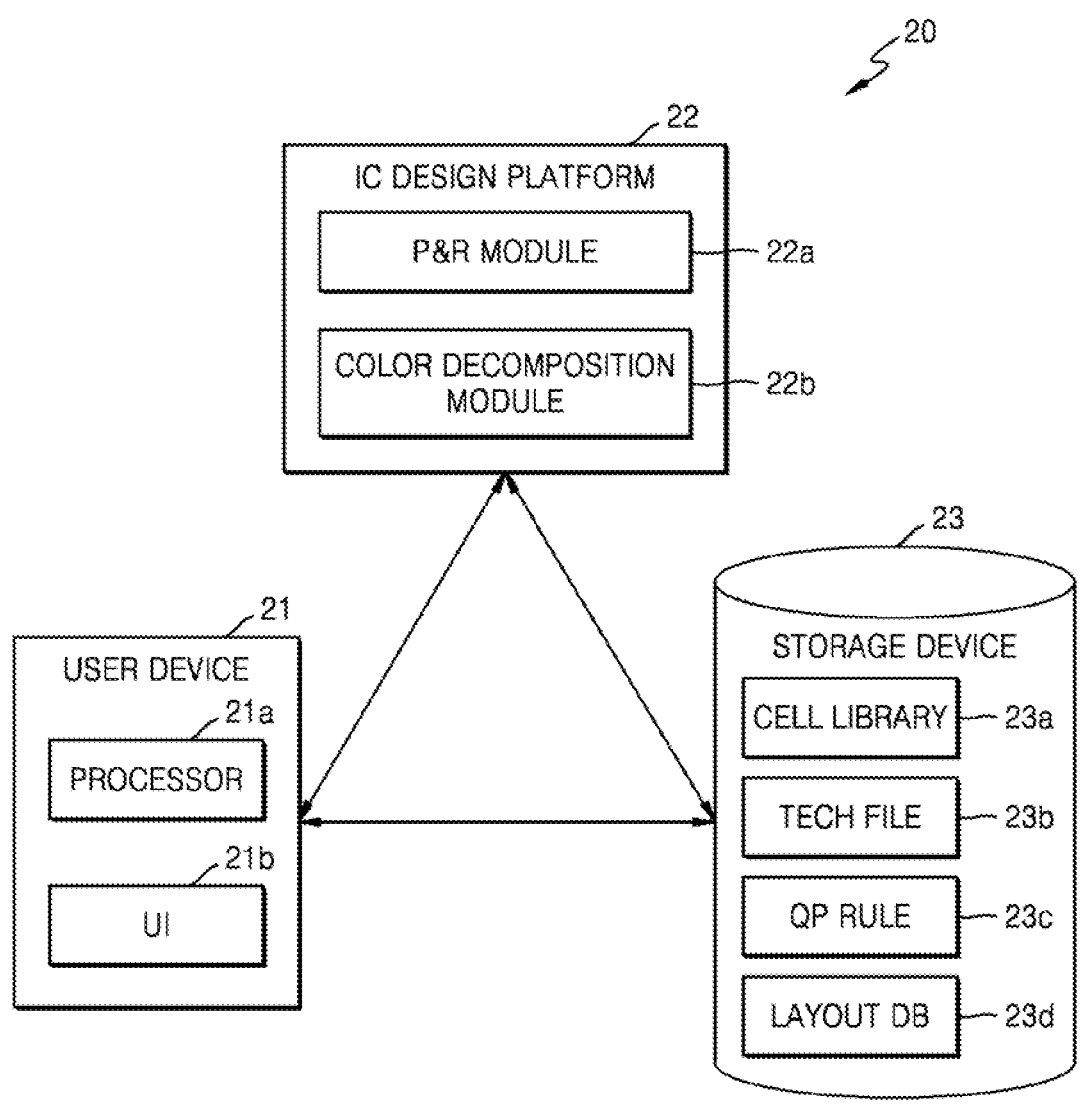
FIG. 5 is a block diagram of a computing system for designing an integrated circuit, according to an exemplary embodiment of the present inventive concept.

FIG. 5 is a block diagram of a computing system for designing an integrated circuit, according to an exemplary embodiment of the present inventive concept.

Referring to FIG. 5, a computing system 20 for designing an integrated circuit may include a user device 21, an integrated circuit (IC) design platform 22, and a storage device 23. The integrated circuit design system 20 may perform operations S100, S120, and S140 described in more detail above. According to an exemplary embodiment of the present inventive concept, at least one of the user device 21, the integrated circuit design platform 22, and the storage device 23 may be a stand-alone device, and the user device 21, the integrated circuit design platform 22, and the storage device 23 may be connected to one another via wired or wireless communication or a network. According to an exemplary embodiment of the present inventive concept, at least one of the user device 21, the integrated circuit design platform 22, and the storage device 23 may be spaced apart from the other devices.

The user device 21 may include a processor 21a and a user interface (UI) 21b. Based on a user input that is input via the user interface 21b, the processor 21a may drive the integrated circuit design platform 22. The integrated circuit design platform 22 may include a P&R module 22a and a color decomposition module 22b, which are sets of instructions for designing an integrated circuit. The P&R module 22a and the color decomposition module 22b may respectively be substantially the same as the P&R module 13a and the color decomposition module 13b, respectively, described in more detail above with reference to FIG. 3. The storage device 23 may include a cell library 23a, a technology file 23b, a QP rule 23c, and a layout DB 23d.

Figure 6:
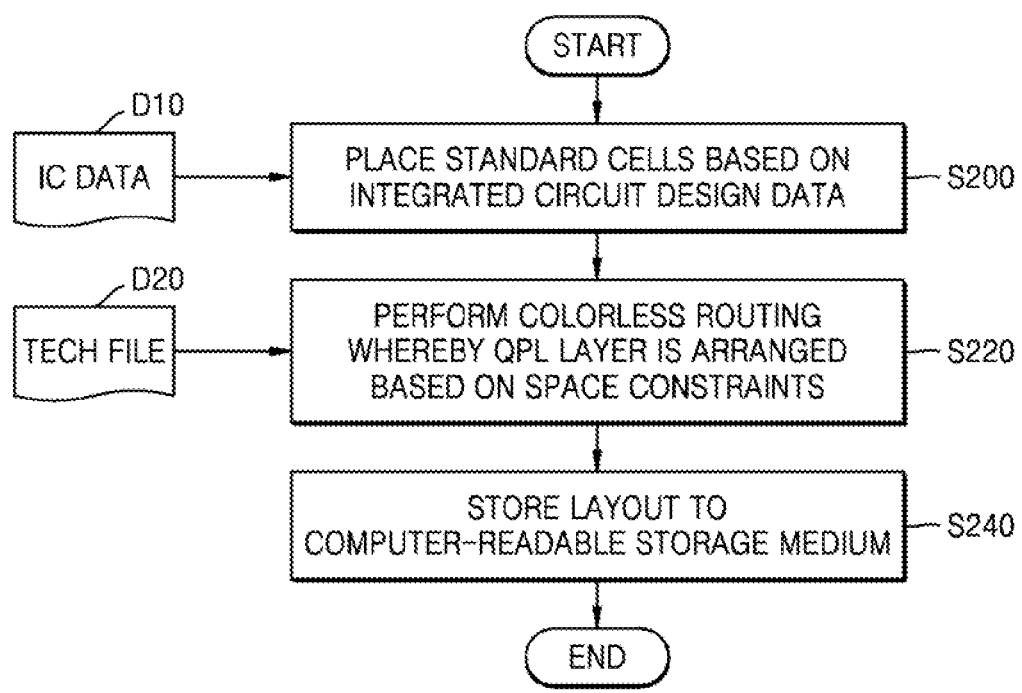
FIG. 6 is a flowchart of a method of designing an integrated circuit, according to an exemplary embodiment of the present inventive concept.

FIG. 6 is a flowchart of a method of designing an integrated circuit, according to an exemplary embodiment of the present inventive concept.

Referring to FIG. 6, the method of designing the integrated circuit according to an exemplary embodiment of the present inventive concept may be performed by using a tool for designing the integrated circuit. The tool for designing the integrated circuit may be a program including a plurality of instructions that are executed by a processor. Thus, the method of designing the integrated circuit nay be referred to as a computer-implemented method for designing the integrated circuit. For example, the method according to an exemplary embodiment of the present inventive concept may be performed by the integrated circuit design system 10 described in more detail above with reference to FIG. 3 or the integrated circuit design system 20 described in more detail above with reference to FIG. 5. An exemplary embodiment of the present inventive concept will be described in more detail below with reference to FIGS. 3, 4 and 6 together.

In operation S200, the standard cells may be placed based on the IC design data defining the integrated circuit. For example, operation S200 may be performed by the processor 11 by using a P&R tool corresponding to the P&R module 13a. For example, the IC design data D10 is received, and the standard cells selected from among the plurality of standard cells stored in the cell library 17a are placed, according to the IC design data D10, by accessing the storage device 17 storing the cell library 17a. The IC design data D10 may be generated from data defined with respect to a behavior of the integrated circuit, for example, data that defined as a register-transfer level (RTL) through synthesis by using the standard cell library. For example, the IC design data D10 may be a bitstream or netlist.

In operation S220, colorless routing may be performed whereby a QPL layer is arranged based on space constraints included in the technology file D20. For example, the technology file D20 may correspond to the technology file 17b. For example, operation S220 may be performed by the processor 11 by using the P&R tool corresponding to the P&R module 13a. As an example, the processor 11 may arrange the patterns included in the QPL layer based on the space constraints stored in the technology file 17b by accessing the storage device 17 storing the technology file 17b.

In operation S240, a layout is stored to a computer-readable storage medium. The computer-readable storage medium may include any storage medium, data of which may be read by a computer during an operation of providing instructions and/or data to the computer. For example, the computer-readable storage medium may include a magnetic or optical medium, such as a disk, a tape, CD-read-only memory (ROM), DVD-ROM, CD-R, CD-RW, DVD-R, or DVD-RW, a volatile or nonvolatile memory, such as RAM, ROM, or a flash memory, a nonvolatile memory accessible via a universal serial bus (USB) interface, or a microelectromechanical system (MEMS). The computer-readable storage medium may be inserted into a computer, integrated into a computer, or coupled to a computer via a communication medium, such as a network and/or a wireless link.

After operation S240, output data defining the integrated circuit, for example, layout data, may be provided to the semiconductor process module. The output data may have a format including all layout information of the standard cells, for example, pattern information of all layers. For example, the output data may have the graphic design system (GDS) II format. Alternatively, the output data may have a format including external information of the standard cells, such as a pin of the standard cells. For example, the output data may have the LEF format or the Milkyway format.

FIGS. 7A, 7B, 7C, 7D and 7E show space constraints for patterns to which different colors are assigned, according to an exemplary embodiment of the present inventive concept.

Figure 7A:
FIGS. 7A, 7B, 7C, 7D and 7E show space constraints for patterns to which different colors are assigned, according to an exemplary embodiment of the present inventive concept.
Figure 7B:
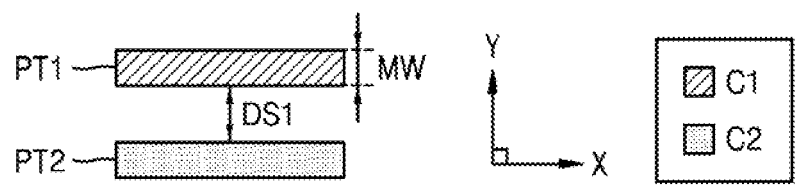
Figure 7C:
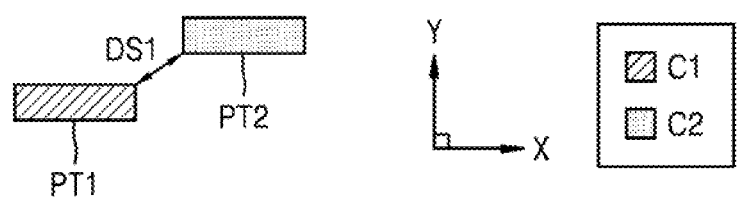
Figure 7D:
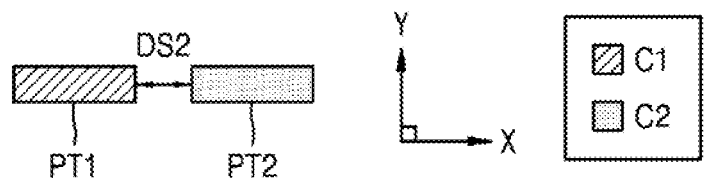
Figures 7E, 8A:
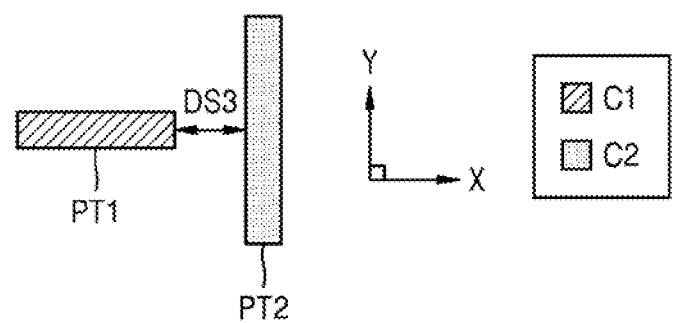
FIGS. 8A, 8B, 8C, 8D and 8E show space constraints for patterns to which the same color is assigned, according to an exemplary embodiment of the present inventive concept.

A table 200 illustrated in FIG. 7A shows definitions of first different color space DS1, second different color space DS2 and third different color space DS3, and a metal width MW. The table 200 and/or the definitions illustrated in table 200 may be included in a technology file (for example, technology file 17b described in more detail above). FIGS. 7B and 7C show the first different color space DS1. For example, FIG. 7B shows a minimum side to side S2S space between a first pattern PT1 and a second pattern PT2, and FIG. 7C shows a minimum corner to corner C2C space between the first pattern PT1 and the second pattern PT2. FIG. 7D shows the second different color space DS2, and FIG. 7E shows the third different color space DS3. For example, FIG. 7D shows a minimum tip to tip T2T space between the first pattern PT1 and the second pattern PT2, and FIG. 7E shows a minimum tip to side T2S space between the first pattern PT1 and the second pattern PT2. Each of FIGS. 7B to 7E illustrate spaces between the first pattern PT1 and the second pattern PT2 having different colors from each other, and spaces between the patterns may be referred to herein as "different color spaces."

According to an exemplary embodiment of the present inventive concept, the first pattern PT1 may be a pattern to which a first color C1 is assigned, and the second pattern PT2 may be a pattern to which a second color C2 is assigned. Herein, a "side" refers to an "edge" of each pattern in a lengthwise direction, and a "tip" refers to an edge of each pattern in a width direction. The "metal width" MW may correspond to a minimum width of a metal pattern, and may be an edge of the pattern in a width direction, for example, a width of a tip. The metal pattern may correspond to the first and second patterns PT1 and PT2 included in a QPL layer.

Referring to FIG. 7B, the first and second patterns PT1 and PT2 may extend in a first direction (for example, a direction X), and may be adjacent to each other in a second direction (for example, a direction Y) perpendicular to the first direction. For example, the first and second patterns PT1 and PT2 may be arranged on two tracks (e.g., two parallel tracks along the X direction) that are adjacent to each other, respectively. The first different color space DS1 may be defined as a minimum side-to-side (S2S) space of the first and second patterns PT1 and PT2.

Referring to FIG. 7C, the first and second patterns PT1 and PT2 may extend in the first direction and may not be adjacent to each other in the second direction. For example, the first and second patterns PT1 and PT2 may be arranged on different tracks. The first different color space DS1 may be defined as a minimum corner-to-corner (C2C) space between the first and second patterns PT1 and PT2. With respect to the QPL layer, the minimum S2S space and the minimum C2C space may be substantially the same as each other.

Referring to FIG. 7D, the first and second patterns PT1 and PT2 may each extend in the first direction and may be adjacent to each other in the first direction. For example, the first and second patterns PT1 and PT2 may be arranged on the same track. The second different color space DS2 may be defined as a minimum tip-to-tip (T2T) space between the first and second patterns PT1 and PT2. According to an exemplary embodiment of the present inventive concept, the second different color space DS2 may be greater than the first different color space DS1. However, exemplary embodiments of the present inventive concept are not limited thereto. In an exemplary embodiment of the present inventive concept, the first and second different color spaces DS1 and DS2 may be substantially the same as each other. In an exemplary embodiment of the present inventive concept, the second different color space DS2 may be smaller than the first different color space DS1.

Referring to FIG. 7E, the first pattern PT1 may extend in the first direction and the second pattern PT2 may extend in the second direction. For example, the first pattern PT1 may be arranged on one track (also referred to as a first track), and the second pattern PT2 may be arranged to cross the first track along a direction perpendicular to the first track. As an example, the second pattern PT2 may extend across a plurality of tracks. The third different color space. DS3 may be defined as a minimum tip-to-side (T2S) space between the first and second patterns PT1 and PT2. According to an exemplary embodiment of the present inventive concept, the second and third different color spaces DS2 and DS3 may be different sizes from each other. However, exemplary embodiments of the present inventive concept are not limited thereto. In some exemplary embodiments of the present inventive concept, the second and third different color spaces DS2 and DS3 may be substantially the same size as each other.

FIGS. 8A, 8B, 8C, 8D and 8E show space constraints for patterns to which the same color is assigned, according to an exemplary embodiment of the present inventive concept. Each of FIGS. 8B to 8E illustrate spaces between the first pattern PT1 and the second pattern PT2 having the same colors as each other, and spaces between the patterns may be referred to herein as "same color spaces."

Figure 8B:
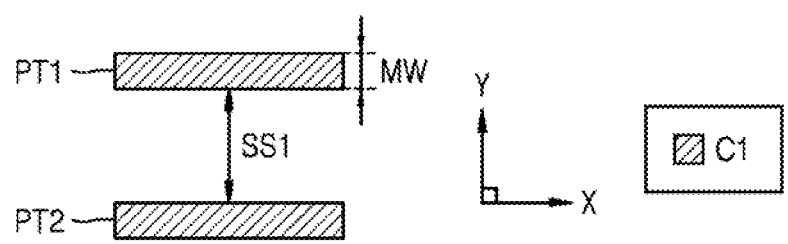
Figure 8C:
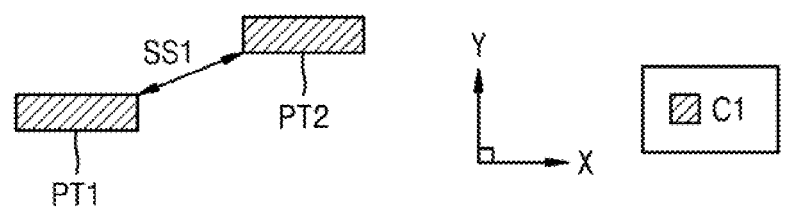
Figure 8D:
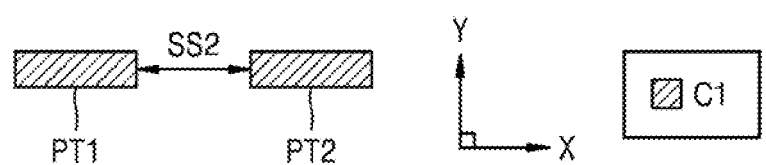

A table 300 illustrated in FIG. 8A shows definitions of first same color spaces SS1, second same color spaces SS2 and third same color spaces SS3, and the metal width MW. The table 300 and/or the definitions illustrated in table 300 may be included in a technology file (for example, 17b described in more detail above). FIG. 8B shows a minimum side to side space S2S of the first same color space SS1 between a first pattern PT1 and a second pattern PT2, and FIG. 8C shows a minimum corner to corner space C2C of the first same color space SS1 between a first pattern PT1 and a second pattern PT2. FIG. 8D shows a minimum tip to tip T2T space of the second same color space SS2 between a first pattern PT1 and a second pattern PT2, and FIG. SE shows a minimum tip to side space of the third same color space SS3 between a first pattern PT1 and a second pattern PT2, According to an exemplary embodiment of the present inventive concept, the first and second patterns PT1 and PT2 may be patterns, to which the first color C1 is assigned. The "metal width" MW may correspond to a minimum width of a metal pattern, and may be an edge of the pattern in a width direction, for example, a width of a tip. The metal pattern may correspond to the first and second patterns PT1 and PT2 included in the QPL layer.

Referring to FIG. 8B, the first and second patterns PT1 and PT2 may extend in a first direction (for example, a direction X) and may be adjacent to each other in a second direction (for example, a direction Y). For example, the first and second patterns PT1 and PT2 may be arranged on two tracks (e.g., two parallel tracks along the X direction) that are adjacent to each other, respectively. The first same color space SS1 may be defined as a minimum S2S space between the first and second patterns PT1 and PT2.

Referring to FIG. 8C, the first and second patterns PT1 and PT2 may extend in the first direction and may not be adjacent to each other in the second direction. For example, the first and second patterns PT1 and PT2 may be arranged on different tracks. The first same color space SS1 may be defined as a minimum C2C space between the first and second patterns PT1 and PT2. With respect to the QPL layer, the minimum S2S space and the minimum C2C space may be substantially the same as each other.

Referring to FIG. 8D, the first and second patterns PT1 and PT2 may extend in the first direction and may be adjacent to each other in the first direction. For example, the first and second patterns PT1 and PT2 may be arranged on the same track. The second same color space SS2 may be defined as a minimum T2T space between the first and second patterns PT1 and PT2. According to an exemplary embodiment of the present inventive concept, the size of second same color space SS2 may be greater than the first same color space SS1. However, exemplary embodiments of the present inventive concept are not limited thereto. In an exemplary embodiment of the present inventive concept, the first and second same color spaces SS1 and SS2 may be substantially the same size. In an exemplary embodiment of the present inventive concept, the second same color space SS2 may be smaller than the first same color apace SS1.

Figure 8E:
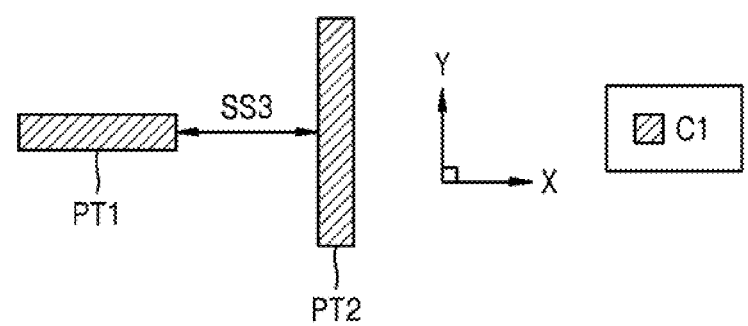

Referring to FIG. 8E, the first pattern PT1 may extend in the first direction and the second pattern PT2 may be arranged to cross the first track along a direction perpendicular to the first track. As an example, the second pattern PT2 may extend across a plurality of tracks. The third same color space SS3 may be defined as a minimum T2S space between the first and second patterns PT1 and PT2. According to an exemplary embodiment of the present inventive concept, the second and third same color spaces SS2 and SS3 may be different sizes from each other. However, exemplary embodiments of the present inventive concept are not limited thereto. In an exemplary embodiment of the present inventive concept, the second and third same color spaces SS2 and SS3 may be substantially the same size as each other.

Figure 9:
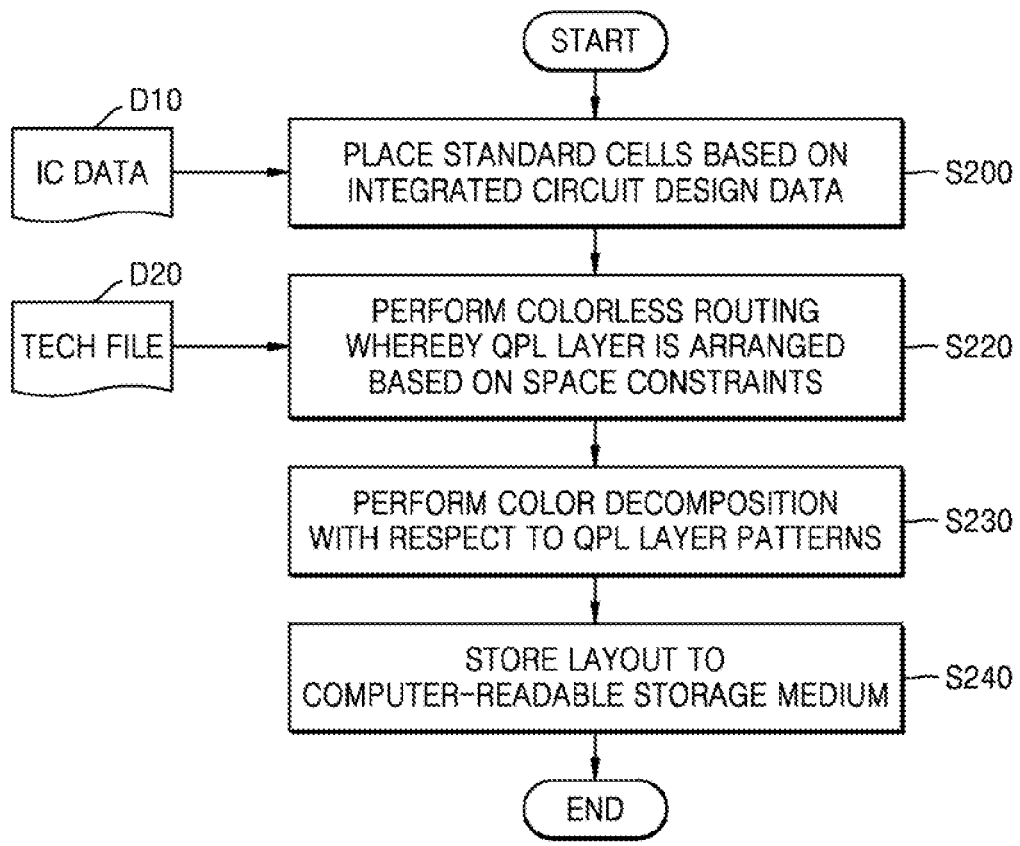
FIG. 9 is a flowchart of a method of designing an integrated circuit, according to an exemplary embodiment of the present inventive concept.

FIG. 9 is a flowchart of a method of designing an integrated circuit, according to an exemplary embodiment of the present inventive concept.

Referring to FIG. 9, the method of designing the integrated circuit, according to an exemplary embodiment of the present inventive concept, may be substantially the same as the method described in more detail above with reference to FIG. 6, except for the modifications described below. For example, the method according to the present embodiment may further include operation S230. In operation S200, the standard cells may be positioned based on the integrated circuit design data D10. In operation S220, to generate a layout of the integrated circuit, the colorless routing may be performed in which the QPL layer is arranged according to the space constraints included in the technology file D20.

In operation S230, the color decomposition may be performed with respect to patterns included in a layer to which QPL is to be applied, for example, with respect to QPL layer patterns. For example, the color decomposition may include assigning different colors to the patterns when a space between adjacent patterns is less than a minimum space between patterns to which the same color is assigned, and assigning the same color to the patterns when the space between the adjacent patterns is equal to or greater than the minimum space between the patterns to which the same color is assigned. In operation S240, the layout on which the color decomposition has been completed is stored to a computer-readable storage medium.

Figure 10:
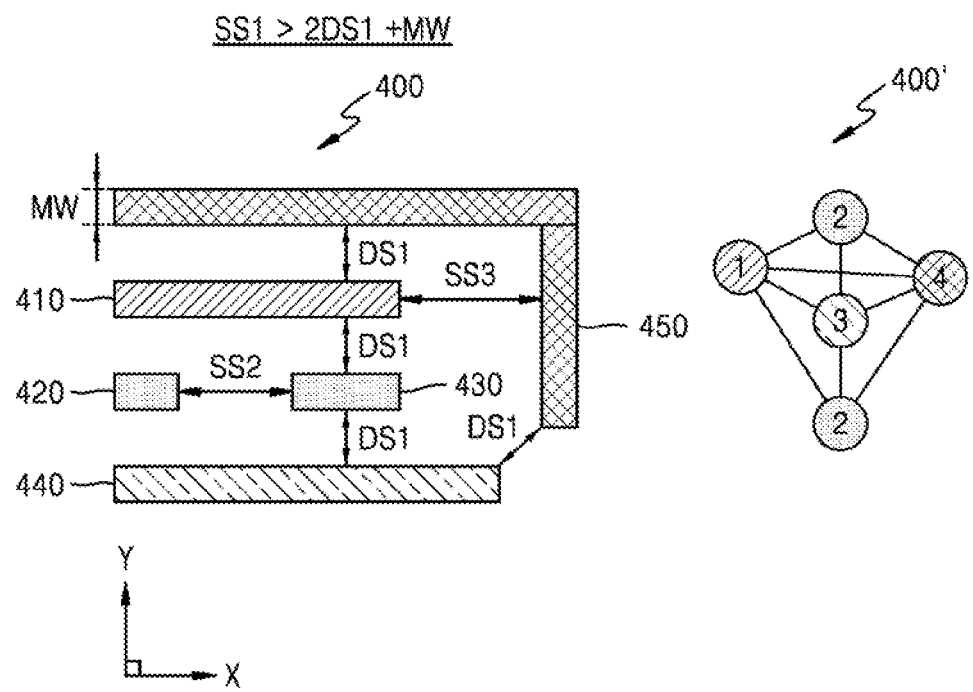
FIG. 10 shows space constraints for patterns that are included in a bi-directional layer, according to an exemplary embodiment of the present inventive concept.

FIG. 10 shows space constraints for patterns that are included in a bi-directional layer, according to an exemplary embodiment of the present inventive concept. The aspects described with reference to FIGS. 7A, 7B, 7C, 7D, 7E, 8A, 8B, 8C, 8D and 8E may be applied to the exemplary embodiment of the present inventive concept described below with reference to FIG. 10.

Referring to FIG. 10, an integrated circuit 400 may include first patterns 410, second patterns 420, third patterns 430, fourth patterns 440 and fifth patterns 450 included in a QPL layer. The first same color space SS1 may be greater than a sum of two times the first different color space DS1 and the metal width MW (e.g., SS1>2DS1+MW). As an example, when a pattern to which the first color is assigned is arranged on a first track, other patterns to which the first color is assigned need not be arranged on second and third tracks, and may be arranged on a fourth track.

According to an exemplary embodiment of the present inventive concept, the QPL layer may be implemented as a bi-directional layer, and the bi-directional layer may include patterns extending in a first direction (for example, a direction X) and patterns extending in a second direction (for example, a direction Y). The first through fourth patterns 410 through 440 may extend in the first direction, and the fifth pattern 450 may include a portion extending in the first direction and a portion extending in the second direction. According to an exemplary embodiment of the present inventive concept, the space constraints included in a technology file (e.g., the technology file 17b described in more detail above) may include first through fourth space constraints. The first through fourth space constraints according to a first example will be described in more detail below.

The first space constraint may define an S2S space to be equal to or greater than the first different color space DS1. Accordingly, an S2S space between the first and third patterns 410 and 430, an S2S space between the third and fourth patterns 430 and 440, and an S2S space between the first and fifth patterns 410 and 450 may be equal to or greater than the first different color space DS1. The second space constraint may define a C2C space to be equal to or greater than the first different color space DS1. Thus, a C2C space between the fourth and fifth patterns 440 and 450 may be equal to or greater than the first different color space DS1.

The third space constraint may define a T2T space to be equal to or greater than the second same color space SS2. Thus, a T2T space between the second and third patterns 420 and 430 may be equal to or greater than the second same color space SS2. The fourth space constraint may define a T2S space to be equal to or greater than the third same color space SS3. Thus, a T2S space between the first and fifth patterns 410 and 450 may be equal to or greater than the third same color space SS3.

A color graph 400' may be generated by modeling a connection relationship of the first through fifth patterns 410 through 450 included in the QPL layer of the integrated circuit 400. For example, the color graph 400' may be generated by modeling each of the first through fifth patterns 410 through 450 of the integrated circuit 400 as a "node," and modeling each of connections between nodes in which a space between adjacent patterns is less than the same color space as an "edge." According to an exemplary embodiment of the present inventive concept, the T2T space between the second and third patterns 420 and 430 to which the same color is assigned may be equal to or greater in size than the second same color space SS2, and thus, the second and third patterns 420 and 430 are not connected to each other in the color graph 400'.

Figure 11A:
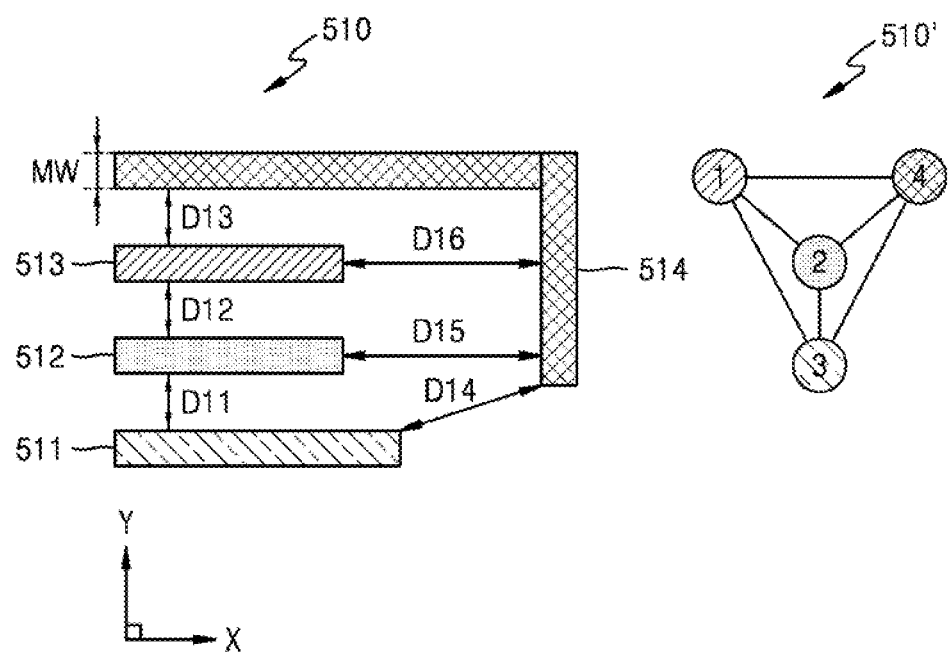
FIGS. 11A, 11B and 11C show color violation check results with respect to patterns that are included in a bi-directional layer, according to an exemplary embodiment of the present inventive concept.
Figure 11B:
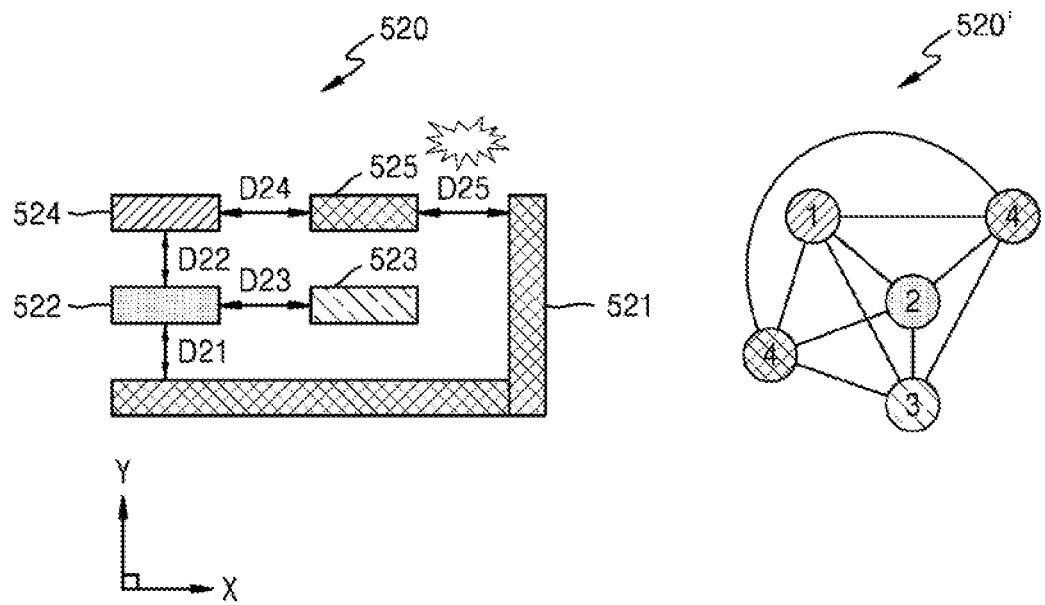
Figure 11C:
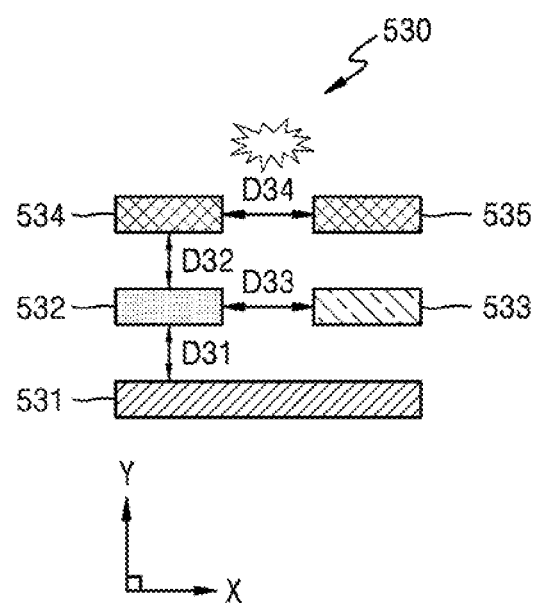

FIGS. 11A, 11B and 11C show color violation check results with respect to patterns that are included in a bi-directional layer, according to an exemplary embodiment of the present inventive concept.

Referring to FIG. 11A, an integrated circuit 510 may be generated by performing colorless routing based on the space constraints described above with reference to FIG. 10, and may include a first pattern 511, a second pattern 512, a third pattern 513 and a fourth pattern 514. S2S spaces D11, D12 and D13 and a C2C space D14 between the first through fourth patterns 511 through 514 may be equal to or greater in size than the first different color space DS1, and thus, may satisfy the first and second space constraints described above with reference to FIG. 10, T2S spaces 115 and D16 between the second through fourth patterns 512 through 514 may be equal to or greater in size than the third same color space SS3, and thus, may satisfy the fourth space constraint described above with reference to FIG. 10. Thus, a color violation is not indicated in a color graph 510' based on the integrated circuit 510.

Referring to FIG. 11B, an integrated circuit 520 may include a first pattern 521, a second pattern 522, a third pattern 523, a fourth pattern 524 and a fifth pattern 525, S2S spaces D21 and D22 between the first and second patterns 521 and 522, and the second and fourth patterns 522 and 524 may be equal to or greater in size than the first different color space DS1, and thus, may satisfy the first space constraint described above with reference to FIG. 10. T2T spaces D23 and D24 between the second and third patterns 522 and 523, and the fourth and fifth patterns 524 and 525, may be less than the second same color space SS2. However, different colors are assigned to the second and third patterns 522 and 523, and different colors are assigned to the fourth and fifth patterns 524 and 525, and thus, a color violation might not occur.

A T2S space D25 between the first and fifth patterns 521 and 525 may be less than the third same color space SS3 described above with reference to FIG. 10. Here, the same color is assigned to the first and fifth patterns 521 and 525, and thus, a color violation may occur between the first and fifth patterns 521 and 525. Thus, a color violation is indicated between patterns to which a fourth color is assigned in a color graph 520' based on the integrated circuit 520.

Referring to FIG. 11C, an integrated circuit 530 may include a first pattern 531, a second pattern 532, a third pattern 533, a fourth pattern 534 and a fifth pattern 535. S2S spaces D31 and D32 between the first and second patterns 531 and 532, and the second and fourth patterns 532 and 534, may be equal to or greater than the first different color space DS1, and thus, may satisfy the first space constraint described above with reference to FIG. 10. A T2T space D33 between the second and third patterns 532 and 533 may be less than the second same color space SS2. However, different colors are assigned to the second and third patterns 532 and 533, and thus, a color violation might not occur.

A T2T space D34 between the fourth and fifth patterns 534 and 535 may be less than the second same color space SS2. Here, the same color is assigned to the fourth and fifth patterns 534 and 535, and thus, a color violation may occur between the fourth and fifth patterns 534 and 535.

Figure 12:
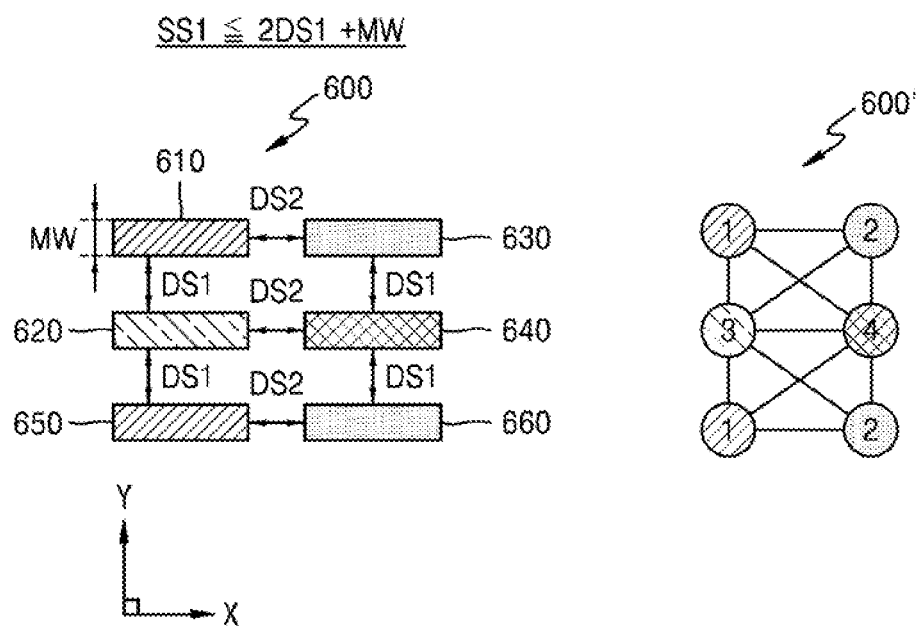
FIG. 12 shows space constraints for patterns that are included in a uni-directional layer, according to an exemplary embodiment of the present inventive concept.

FIG. 12 shows space constraints for patterns that are included in a unidirectional layer, according to an exemplary embodiment of the present inventive concept. The aspects described with reference to FIGS. 7A, 7B, 7C, 7D, 7E, 8A, 8B, 8C, 8D and 8E may be applied to the exemplary embodiment of the present inventive concept described below with reference to FIG. 12.

Referring to FIG. 12, an integrated circuit 600 may include a first pattern 610, a second pattern 620, a third pattern 630, a fourth pattern 640, a fifth pattern 650 and a sixth pattern 660 included in a QPL layer. The first same color space SS1 may be equal to or less than a sum of two times the first different color space DS1 and the metal width MW (e.g., $SS1 \leq 2DS1+MV$). For example, when $SS1=2DS1+MW$, and when a pattern to which a first color is assigned is arranged on a first track, other patterns to which the first color is assigned may not be arranged on a second track and may be arranged on a third track.

According to an exemplary embodiment of the present inventive concept, the QPL layer may be implemented as a uni-directional layer. The first through sixth patterns 610 through 660 may extend in a first direction (for example, a direction X). According to an exemplary embodiment of the present inventive concept, the space constraints included in a technology file (e.g., technology file 17b described in more detail above) may include first through third space constraints. The first through third space constraints according to a second example will be described in more detail below with reference to FIGS. 13A to 13C.

The first space constraint condition may define a S2S space to be equal to or greater than the first different color space DS1. Thus, an S2S space between the first and second patterns 610 and 620, an S2S space between the third and fourth patterns 630 and 640, an S2S space between the second and fifth patterns 620 and 650, and an S2S space between the fourth and sixth patterns 640 and 660 may be equal to or greater than the first different color space DS1. The second space constraint may define a C2C space to be equal to or greater than the first different color space DS1. Thus, a C2C space between the first through sixth patterns 610 through 660 may be equal to or greater than the first different color space DS1.

The third space constraint may define a T2T space to be equal to or greater than the second different color space DS2. Thus, a T2T space between the first and third patterns 610 and 630, a T2T space between the second and fourth patterns 620 and 640, and a T2T space between the fifth and sixth patterns 650 and 660 may be equal to or greater than the second different color space DS2. According to an exemplary embodiment of the present inventive concept, since the QPL layer is a unidirectional layer, the QPL layer does not include a pattern extending in a second direction (e.g. a direction Y). Thus, according to the present embodiment, a T2S space is not permitted.

A color graph 600' may be generated by modeling a connection relationship of the first through sixth patterns 610 through 660 included in the QPL layer of the integrated circuit 600. According to the present embodiment, an S2S space between the first and fifth patterns 610 and 650 assigned to the same color is 2DS1+MW, and thus, the S2S space between the first and fifth patterns 610 and 650 may be equal to or greater than the first same color space SS1. Thus, in the color graph 600', the first and fifth patterns 610 and 650 are not directly connected to each other. Similarly, an S2S space between the third and sixth patterns 630 and 660 assigned to the same color is 2DS1+MW, and thus, the S2S space between the third and sixth patterns 630 and 660 may be equal to or greater than the first same color space SS1. Thus, in the color graph 600', the third and sixth patterns 630 and 660 are not directly connected to each other.

Figure 13A:
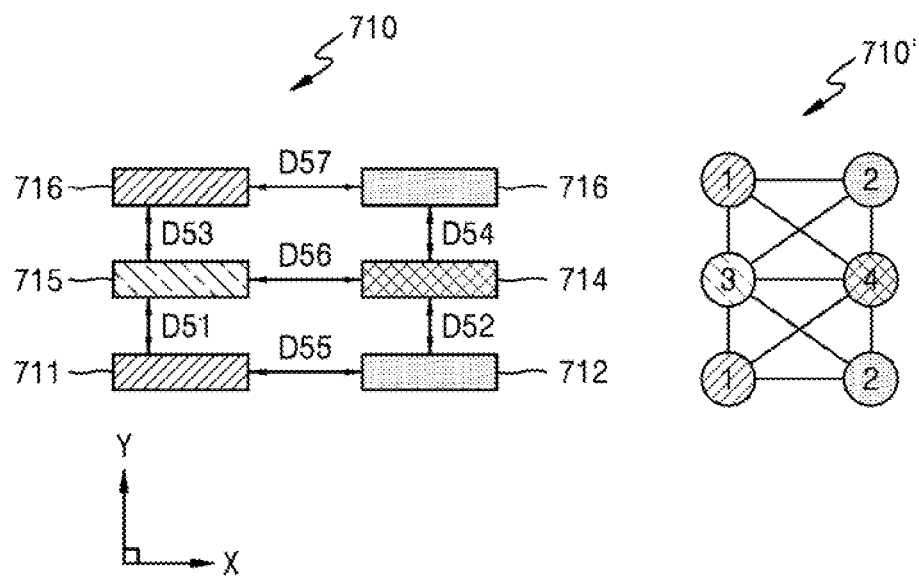
FIGS. 13A, 13B and 13C show color violation check results with respect to patterns that are included in a unidirectional layer, according to an exemplary embodiment of the present inventive concept.
Figure 13B:
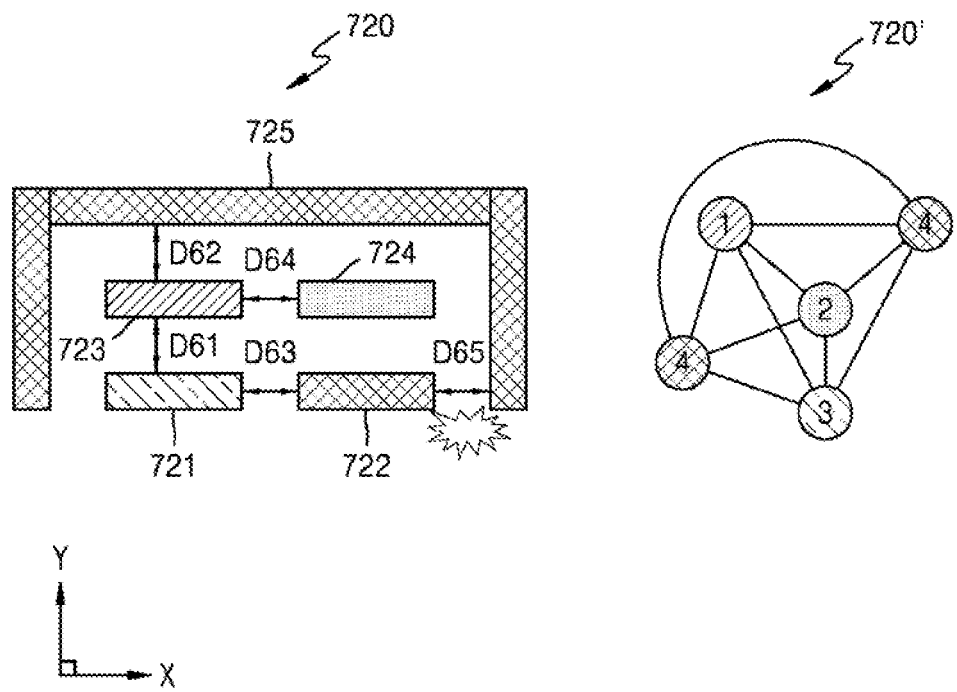
Figure 13C:
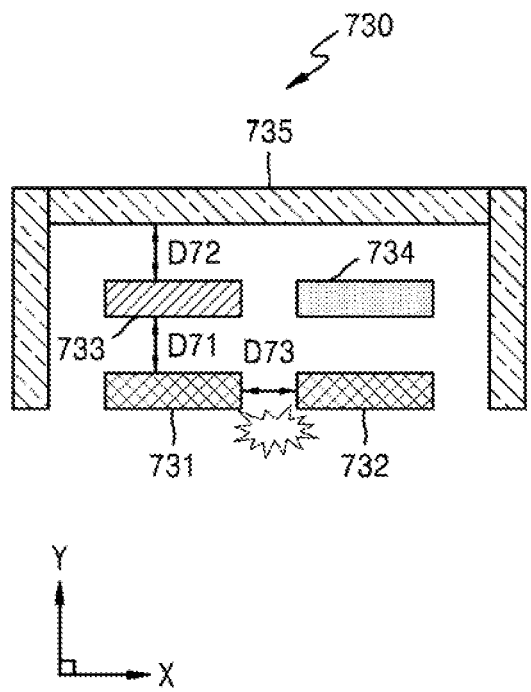

FIGS. 13A, 13B and 13C show color violation check results with respect to patterns that are included in a uni-directional layer, according to an exemplary embodiment of the present inventive concept.

Referring to FIG. 13A, an integrated circuit 710 may be generated by performing colorless routing based on the space constraints described above with reference to FIG. 12, and may include a first pattern 711, a second pattern 712, a third pattern 713, a fourth pattern 714, a fifth pattern 715 and a sixth pattern 716. S2S spaces D51, D52, D53 and D54 between the first through sixth patterns 711 through 716 may be equal to or greater than the first different color space DS1, and thus, may satisfy the first space constraint described above with reference to FIG. 12, T2T spaces D55, D56 and D57 between the first through sixth patterns 711 through 716 may be equal to or greater than the second different color space DS2, and thus, may satisfy the second space constraint described above with reference to FIG. 12, Thus, in a color graph 710 based on the integrated circuit 710, a color violation is not indicated.

Referring to FIG. 13B, an integrated circuit 720 may include a first pattern 721, a second pattern 722, a third pattern 723, a fourth pattern 724 and a fifth pattern 725. S2S spaces D61 and D62 between the first and third patterns 721 and 723, and the third and fifth patterns 723 and 725, may be equal to or greater than the first different color space DS1, and thus, may satisfy the first space constraint described above with reference to FIG. 12. T2T spaces D63 and D64 between the first and second patterns 721 and 722, and the third and fourth patterns 723 and 724, may be equal to or greater than the second different color space DS2, and thus, may satisfy the second space constraint described above with reference to FIG. 12.

A T2S space D65 between the second and fifth patterns 722 and 725 may be less than the third same color space SS3. Thus, a color violation may occur between the second and fifth patterns 722 and 725 based on the presence of the T2S space D65. Thus, a color violation is indicated between patterns to which a fourth color is assigned in a color graph 720' based on the integrated circuit 720. According to the space constraints described above with reference to FIG. 12, when the first same color space SS1 is equal to or less than 2DS1+MW, a pattern extending in the second direction is not permitted, and thus, a T2S space is not permitted. Thus, the color violation illustrated in FIG. 13B might occur.

Referring to FIG. 13C, an integrated circuit 730 may include a first pattern 731, a second pattern 732, a third pattern 733, a fourth pattern 734 and a fifth pattern 735. S2S spaces D71 and D72 between the first and third patterns 731 and 733, and the third and fifth patterns 733 and 735, may be equal to or greater than the first different color space DS1, and thus, may satisfy the first space constraint described above with reference to FIG. 12. A T2T space D73 between the first and second patterns 731 and 732 may be less than the second same color space SS2. Thus, a color violation may occur between the first and second patterns 731 and 732.

Figure 14:
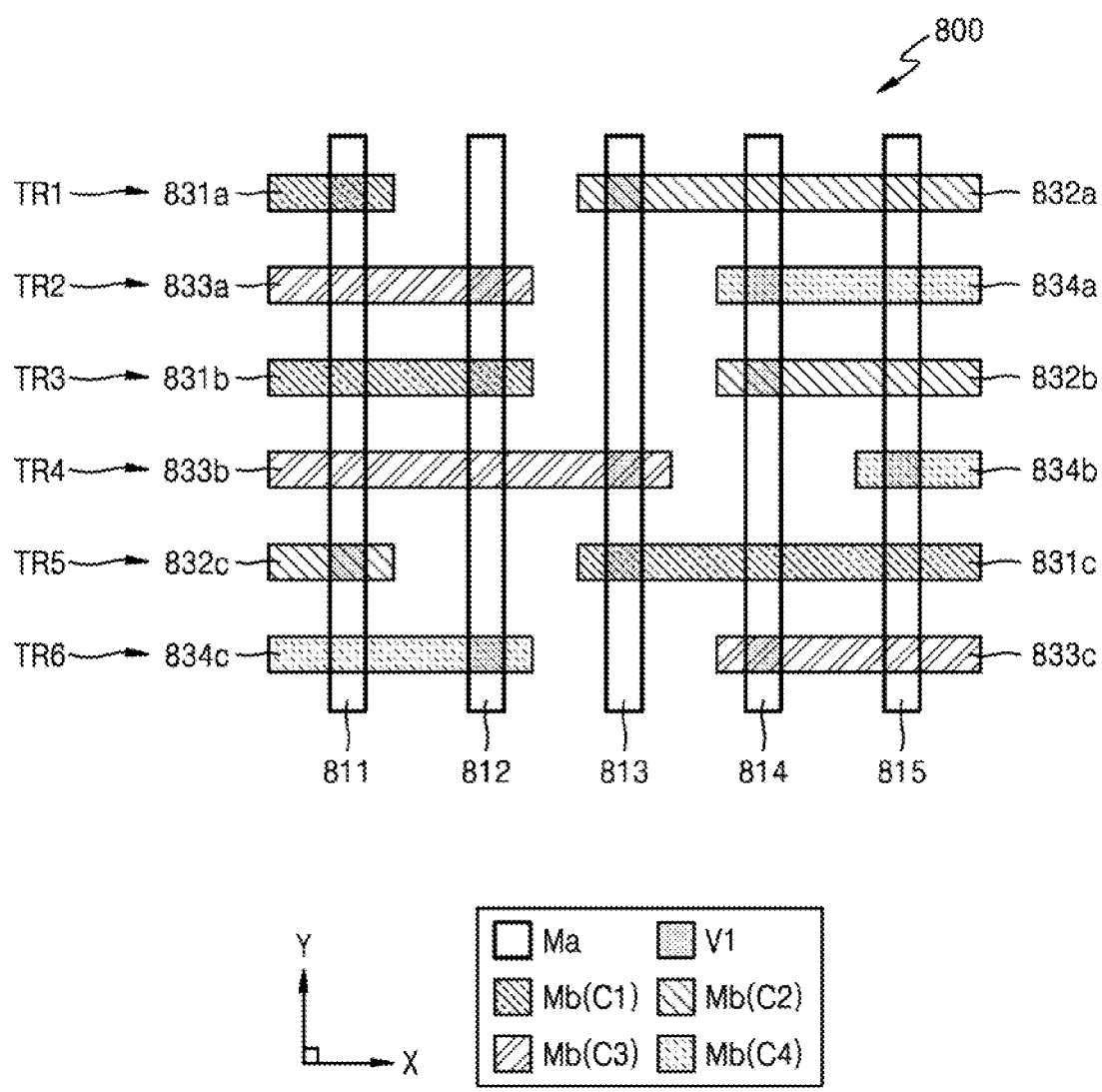
FIG. 14 shows an example of a layout generated by color decomposition with respect to a QPL layer, according to an exemplary embodiment of the present inventive concept.

FIG. 14 shows an example of a layout generated by color decomposition with respect to a QPL layer, according to an exemplary embodiment of the present inventive concept.

Referring to FIG. 14, a layout 800 may include a first metal layer Ma including a plurality of first metal patterns 811, 812, 813, 814 and 815, first vias V1 on the first metal layer Ma, and a second metal layer Mb including a plurality of second metal patterns 831a, 831b, 831c, 832a, 832b, 832c, 833a, 833b, 833c, 834a, 834b and 834c on the first vias V1. The first metal patterns 811 through 815 may extend in a second direction (for example, a direction Y) and may be arranged substantially in parallel with one another. The second metal patterns 831a, 831b, 831c, 832a, 832b, 832c, 833a, 833b, 833c, 834a, 834b and 834c may extend in a first direction (for example, a direction X). For example, the second metal layer Mb may correspond to a QPL layer to which QPL is to be applied, and the first through fourth colors C1 through C4 may be assigned to the second metal patterns 831a through 834c, respectively.

For example, the first color C1 may be assigned to the second metal patterns 831a, 831b, and 831c respectively arranged on first, third, and fifth tracks TR1, TR3, and TR5, and the second color C2 may be assigned to the second metal patterns 832a, 832b, and 832c respectively arranged on the first, third, and fifth tracks TR1, TR3, and TR5. Also, the third color C3 may be assigned to the second metal patterns 833a, 833b, and 833c respectively arranged on second, fourth, and sixth tracks TR2, TR4, and TR6, and the fourth color C4 may be assigned to the second metal patterns 834a, 834b, and 834c respectively arranged on the second, fourth, and sixth tracks TR2, TR4, and TR6.

Figure 15:
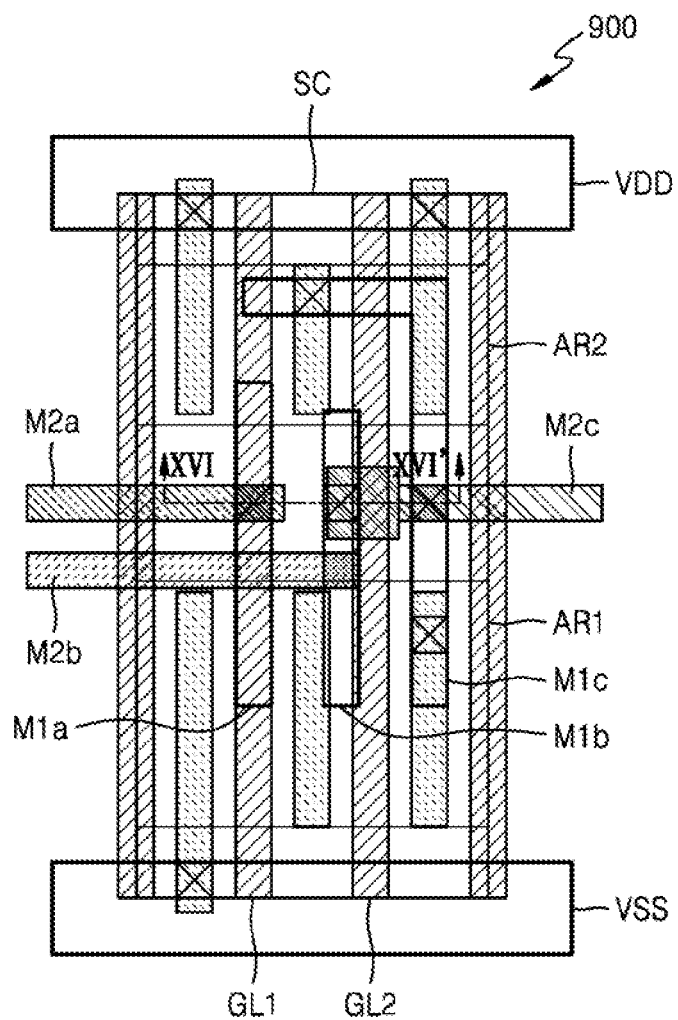
FIG. 15 is a layout of an integrated circuit according to an exemplary embodiment of the present inventive concept.

FIG. 15 is a layout of an integrated circuit according to an exemplary embodiment of the present inventive concept.

Referring to FIG. 15, an integrated circuit layout 900 may include a standard cell SC. The standard cell SC may include first and second active regions AR1 and AR2, first and second gate lines GL1 and GL2, gate contacts CB, source/drain contacts CA, vias V0, and lower patterns M1 (e.g., first lower pattern M1a, second lower pattern M1b and third lower pattern M1c). The integrated circuit layout 900 may include a ground voltage line VSS and a power supply voltage line VDD.

The first and second active regions AR1 and AR2 may extend in a first direction (for example, a direction X), and may have different conductive types. The first and second active regions AR1 and AR2 may each be referred to as diffusion regions. A region between the first active region AR1 and the second active region AR2 may be referred to as a dummy region or a middle of line (MOL) region. A plurality of active pins extending in the second direction may be arranged in the first and second active regions AR1 and AR2, and at least one dummy pin extending in the second direction may be arranged in the dummy region. For example, the active pins arranged in the first active region AR1 may be included in an n-channel metal oxide semi-conductor (NMOS) transistor, and the active pins arranged in the second active region AR2 may be included in a p-channel metal oxide semiconductor CMOS) transistor. The source/drain contacts CA may be arranged in the first and second active regions AR1 and AR2 and may extend in the second direction. For example, each source/drain contact CA may be arranged between two adjacent gate lines. The source/drain contacts CA may correspond to source/drain contacts of a semiconductor device.

The first and second gate lines GL1 and GL2 may extend in the second direction across the first and second active regions AR1 and AR2, and may be arranged substantially in parallel with each other in the first direction. The first and second gate lines GL1 and GL2 may correspond to gate electrodes of the semiconductor device. The gate contacts CB may be arranged between the first active region AR1 and the second active region AR2. For example, the gate contacts CB may be arranged on the first and second gate lines GL1 and GL2. The gate contacts CB may correspond to gate contacts of the semiconductor device. The vias V0 may be arranged on the gate contacts CB, respectively.

The integrated circuit layout 900 may be generated by performing routing that arranges vias V1 and upper patterns (e.g., first upper pattern M2a, second upper pattern M2b and third upper pattern M2c) on the first through third lower patterns M1a through M1c included in the standard cell SC. The vias V1 may be arranged on the first through third lower patterns M1a through M1c, respectively. The first through third upper patterns M2a through M2c may be arranged on the vias V1, respectively, According to an exemplary embodiment of the present inventive concept, the first through third upper patterns M2a, through M2c, may be arranged to satisfy space constraints included in a technology file (e.g. the technology file 17b described in more detail above).

Figure 16:
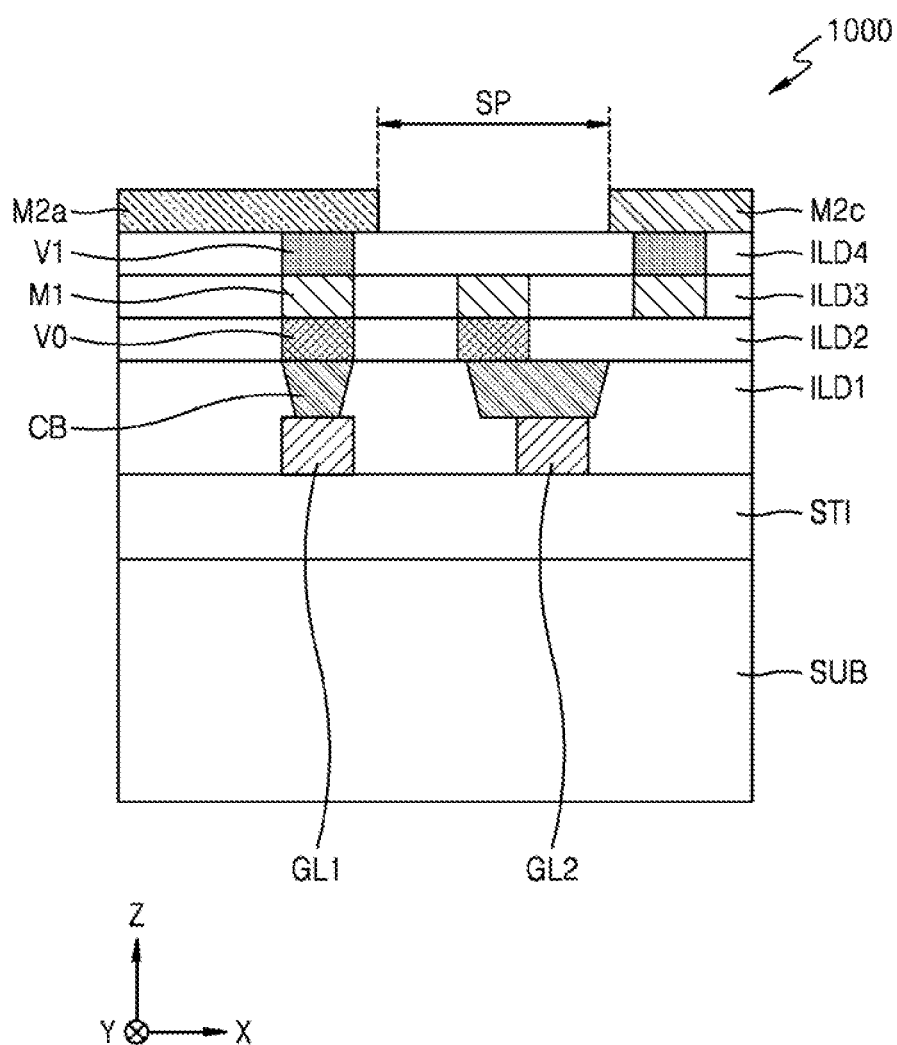
FIG. 16 is a cross-sectional view taken along a line XVI-XVI' of FIG. 15.

FIG. 16 is a cross-sectional view taken along a line XVI-XVI' of FIG. 15. A semiconductor device 1000 described with reference to FIG. 16 may be an example of a semiconductor device including the integrated circuit layout 900 described with reference to FIG. 15.

Referring to FIG. 16, a substrate SUB may be a semiconductor substrate. For example, the semiconductor substrate may be any one of a silicon-on-insulator (SOI) substrate, silicon-on-sapphire, germanium, silicon-germanium, or gallium-arsenide. A device separation layer ST1 may be positioned on the substrate SUB and a first insulating layer ILD1 may be positioned on the device separation layer ST1. The first insulating layer ILD1 may include an insulating material. For example, the insulating material may include any one of an oxide layer, a nitride layer, or an oxynitride layer.

The first and second gate lines GL1 and GL2 may be positioned on the device separation layer ST1. The first and second gate lines GL1 and GL2 may include, for example, a metal material, such as tungsten (W) or tantalum (Ta), a nitride thereof, a silicide thereof, or doped polysilicon. For example, the first and second gate lines GL1 and GL2 may be formed by using a deposition process. The gate contacts CB may be arranged on the first and second gate lines GL1 and GL2, respectively, and the vias V0 may be formed above the gate contacts CB, respectively. The gate contacts CB and the vias V0 may include, for example, a material having electrical conductivity, such as W.

The vias V1 may be positioned above a second insulating layer ILD2 and a third insulating layer ILD3 and a lower layer M1. The first and third upper patterns M2a and M2c may be disposed on a fourth insulating layer ILD4 and above vias V1. According to an exemplary embodiment of the present inventive concept, an upper layer including the first and third upper patterns M2a and M2c may be a bi-directional layer. Here, a space SP between the first and third upper patterns M2a and M2c may be equal to or greater than a second same color space SS2 defined in a technology file (e.g. the technology file 17b described in more detail above). According to an exemplary embodiment of the present inventive concept, the upper layer may be a uni-directional layer. Here, a space SP between the first and third upper patterns M2a and M2c may be equal to or greater than the second different color space DS2 defined in a technology file (e.g. the technology file 17b described in more detail above).

Figure 17:
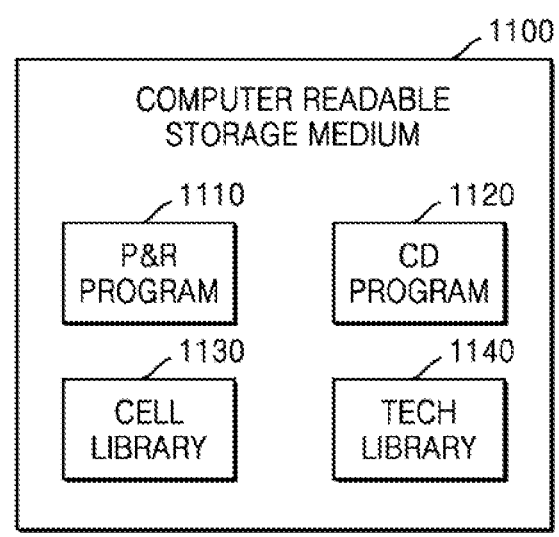
FIG. 17 shows a computer-readable storage medium according to an exemplary embodiment of the present inventive concept.

FIG. 17 shows a computer-readable storage medium according to an exemplary embodiment of the present inventive concept. Referring to FIG. 17, a computer-readable storage medium 1100 may store a P&R program 1110, a color decomposition program 1120, a cell library 1130, and a technology library 1140.

The P&R program 1110 may include a plurality of instructions for performing the methods of generating the layout of the integrated circuit according to an exemplary embodiment of the present inventive concept. For example, the P&R program 1110 may be used to perform operations S100 and S120 (e.g., described above in more detail with reference to FIG. 1), and operations S200 and S220 (e.g., described above in more detail with reference to FIGS. 6 and 9). The color decomposition program 1120 may include a plurality of instructions for performing a color decomposition operation. For example, the color decomposition program 1120 may be used to perform operation S140 (e.g., described above in more detail with reference to FIG. 1), and operation S230 (e.g., described above in more detail with reference to FIG. 9).

The cell library 1130 may be a standard cell library and may include information about a standard cell, which is a unit for forming an integrated circuit. According to an exemplary embodiment of the present inventive concept, the information about the standard cell may include layout information used to generate a layout. According to an exemplary embodiment of the present inventive concept, the information about the standard cell may include timing information used for verification or simulation of the layout. The technology library 1140 may store a plurality of technology files. According to an exemplary embodiment of the present inventive concept, each of the technology files may include space constraints between QPL layer patterns, as described herein.

While the present inventive concept has been particularly shown and described with reference to exemplary embodiments thereof, it will be understood that various changes in form and details may be made therein without departing from the spirit and scope of the present inventive concept.

What is claimed is:

1. A computer-implemented method comprising:
   placing standard cells based on design data defining an integrated circuit;
   generating a layout of the integrated circuit by performing colorless routing of first, second, third, and fourth patterns included in a quadruple patterning lithography (QPL) layer based on space constraints corresponding to a plurality of predetermined definitions, on the placed standard cells,
   wherein each predetermined definition depends on a specific position relationship of adjacent patterns, identities of colors to be respectively assigned to adjacent patterns, and a minimum space between adjacent patterns,
   wherein the positional relationships include one of adjacent patterns disposed in a same track, adjacent patterns disposed in parallel, or adjacent patterns perpendicularly disposed;
   assigning first, second, third and fourth colors to the first, second, third and fourth patterns, respectively, during a color decomposition process;
   storing the generated layout to a computer-readable storage medium;
   generating masks based on the layout; and
   manufacturing a semiconductor device by using the generated masks,
   wherein a space between two patterns of the first, second, third and fourth patterns smaller than a corresponding space constraint of the space constraints indicates a color violation.

2. The method of claim 1, wherein the masks includes first, second, third and fourth masks, and the first, second, third and fourth colors respectively correspond to the first, second, third and fourth masks.

3. The method of claim 1, wherein the generating of the layout comprises receiving a technology file including the space constraints, and performing the colorless routing based on the received technology file.

4. The method of claim 1, wherein the first and second patterns extend in a first direction and are adjacent to each other in a second direction perpendicular to the first direction, and the space constraints comprise a first space constraint that defines a minimum space between the first and second patterns as a first space between patterns of the first, second, third and fourth patterns to which different colors are assigned.

5. The method of claim 4, wherein the first space is a minimum side-to-side space between patterns of the first, second, third and fourth patterns to which different colors are assigned.

6. The method of claim 4, wherein the space constraints further comprise a second space constraint that defines a minimum corner-to-corner space between patterns of the first, second, third and fourth patterns to Which different colors are assigned.

7. The method of claim 4, wherein the quadruple patterning lithography layer is a bi-directional layer, the third pattern extends in the first direction and is substantially aligned with the first pattern or the second pattern in the first direction, and the space constraints further comprise a third space constraint that defines a minimum space between the first or second pattern and the third pattern as a second space between patterns of the first, second, third and fourth patterns to which a same color is assigned.

8. The method of claim 7, wherein the second space is a minimum tip-to-tip space between the patterns of the first, second, third and fourth patterns to which the same color is assigned.

9. The method of claim 7, wherein the fourth pattern extends in the second direction, and the space constraints further comprise a fourth space constraint that defines a minimum space between the fourth pattern and each of the first through third patterns as a third space between the patterns of the first, second, third and fourth patterns to which the same color is assigned.

10. The method of claim 9, wherein the third space is a minimum tip-to-side space between the patterns of the first, second, third and fourth patterns to which the same color is assigned.

11. The method of claim 4, wherein the quadruple patterning lithography layer is a uni-directional layer, the third and fourth patterns extend in the first direction and are respectively aligned with the first and second patterns in the first direction, and the space constraints further comprise a third space constraint that defines a minimum space between the first and third patterns and a minimum space between the second and fourth patterns as a second space between the patterns of the first, second, third and fourth patterns to which different colors are assigned.

12. The method of claim 11, wherein the second space is a minimum tip-to-tip space between the patterns of the first, second, third and fourth patterns to which different colors are assigned.

13. A computing system comprising:
a memory configured to store procedures for designing an integrated circuit; and
a processor configured to access the memory and to execute the procedures for designing the integrated circuit,
wherein the procedures for designing the integrated circuit comprise:
a placer configured to place standard cells based on design data defining the integrated circuit, and
a router configured to perform colorless routing, wherein the colorless routing arranges first, second, third and fourth patterns included in a quadruple patterning lithography (QPL) layer, based on space constraints corresponding to a plurality of predetermined definitions, on the placed standard cells,
wherein each predetermined definition depends on a specific positional relationship of adjacent patterns, identities of colors to be respectively assigned to adjacent patterns, and a minimum space between adjacent patterns,
wherein the positional relationships include one of adjacent patters disposed in a same track, adjacent patters disposed in parallel, or adjacent patterns perpendicularly disposed,
wherein a space between two patterns of the first, second, third and fourth patterns smaller than a corresponding space constraint of the space constraints indicates a color violation.

14. The system of claim 13, wherein the procedures further comprise a color decomposer configured to assign first, second, third and fourth colors to the first through fourth patterns, respectively, during a color decomposition process.

15. The system of claim 13, wherein the router is further configured to receive a technology file including the space constraints and to perform the colorless routing based on the received technology file.

16. A computer-implemented method comprising:
placing standard cells based on design data defining an integrated circuit;
generating a layout of the integrated circuit by performing colorless routing of a first pattern, a second pattern, a third pattern, and a fourth pattern included in a quadruple patterning lithography (QPL) layer based on space constraints corresponding to a plurality of predetermined definitions, on the placed standard cells,
wherein each predetermined definition depends on a specific positional relationship of adjacent patterns, identities of colors to be respectively assigned to adjacent patterns, and a minimum space between adjacent patterns,
wherein the positional relationships include one of adjacent patterns disposed in a same track, adjacent patterns disposed in parallel, or adjacent patterns perpendicularly disposed;
storing the generated layout to a computer-readable storage medium;
generating a first mask, a second mask, a third mask, and a fourth mask based on the layout; and
manufacturing a semiconductor device by using the first mask, the second mask, the third mask, and the fourth mask,
wherein a space between two patterns of the first, second, third and fourth patterns smaller than a corresponding space constraint of the space constraints indicates a color violation.

17. The method of claim 16, further comprising:
assigning a first color, a second color, a third color, and a fourth color to the first pattern, the second pattern, the third pattern, and the fourth pattern, respectively,
wherein the first color, the second color, the third color, and the fourth color respectively correspond to the first mask, the second mask, the third mask, and the fourth mask.

18. The method of claim 16, further comprising:
performing color decomposition with respect to QPL layer patterns.

19. The method of claim 18, wherein the performing color decomposition comprises assigning different colors to the first pattern, the second pattern, the third pattern, and the fourth pattern when a space between the first pattern, the second pattern, the third pattern, and the fourth pattern is less than a minimum space between patterns with same colors.

20. The method of claim 18, wherein the performing color decomposition comprises assigning same colors to the first pattern, the second pattern, the third pattern, and the fourth pattern when a space between the first pattern, the second pattern, the third pattern, and the fourth pattern is equal to or greater than a minimum space between patterns with different colors.

\* \* \* \* \*